United States Patent
Avanzi et al.

(10) Patent No.: US 10,223,289 B2
(45) Date of Patent: *Mar. 5, 2019

(54) SECURE HANDLING OF MEMORY CACHES AND CACHED SOFTWARE MODULE IDENTITIES FOR A METHOD TO ISOLATE SOFTWARE MODULES BY MEANS OF CONTROLLED ENCRYPTION KEY MANAGEMENT

(71) Applicant: QUALCOMM Incorporated, San Diego, CA (US)

(72) Inventors: Roberto Avanzi, Munich (DE); David Hartley, Seaview Downs (AU); Rosario Cammarota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 15/070,947

(22) Filed: Mar. 15, 2016

(65) Prior Publication Data

US 2017/0010982 A1   Jan. 12, 2017

Related U.S. Application Data

(60) Provisional application No. 62/189,738, filed on Jul. 7, 2015.

(51) Int. Cl.
*G06F 21/00* (2013.01)
*G06F 12/14* (2006.01)
(Continued)

(52) U.S. Cl.
CPC ...... *G06F 12/1408* (2013.01); *G06F 12/0802* (2013.01); *G06F 12/1466* (2013.01);
(Continued)

(58) Field of Classification Search
None
See application file for complete search history.

(56) References Cited

U.S. PATENT DOCUMENTS

| | | | |
|---|---|---|---|
| 7,136,488 B2 | 11/2006 | Hashimoto et al. | |
| 7,568,112 B2 * | 7/2009 | Yamaguchi | G06F 12/0802 |
| | | | 711/118 |

(Continued)

FOREIGN PATENT DOCUMENTS

WO   WO-2014028663 A2   2/2014

OTHER PUBLICATIONS

US 2010/0122095 A1, 05/2010, Jones et al. (withdrawn)
(Continued)

*Primary Examiner* — Lynn D Feild
*Assistant Examiner* — Vadim Savenkov
(74) *Attorney, Agent, or Firm* — Loza & Loza, LLP

(57) ABSTRACT

In an aspect, a cache memory device receives a request to read an instruction or data associated with a memory device. The request includes a first realm identifier and a realm indicator bit, where the first realm identifier enables identification of a realm that includes one or more selected regions in the memory device. The cache memory device determines whether the first realm identifier matches a second realm identifier in a cache tag when the instruction or data is stored in the cache memory device, where the instruction or data stored in the cache memory device has been decrypted based on an ephemeral encryption key associated with the second realm identifier when the first realm identifier indicates the realm and when the realm indicator bit is enabled. The cache memory device transmits the instruction or data when the first realm identifier matches the second realm identifier.

42 Claims, 13 Drawing Sheets

(51) Int. Cl.
*G06F 12/0802* (2016.01)
*G06F 21/14* (2013.01)
*G06F 21/79* (2013.01)
*G06F 21/60* (2013.01)

(52) U.S. Cl.
CPC .............. *G06F 21/14* (2013.01); *G06F 21/79* (2013.01); *G06F 21/602* (2013.01)

(56) References Cited

U.S. PATENT DOCUMENTS

| | | | |
|---|---|---|---|
| 7,590,869 B2 | 9/2009 | Hashimoto | |
| 7,793,083 B2 | 9/2010 | Harada et al. | |
| 8,516,271 B2* | 8/2013 | Faraboschi | G06F 12/0246 713/164 |
| 8,839,000 B2* | 9/2014 | Walrath | G06F 21/602 713/190 |
| 2003/0033537 A1* | 2/2003 | Fujimoto | G06F 21/123 713/193 |
| 2003/0065933 A1* | 4/2003 | Hashimoto | G06F 21/123 713/194 |
| 2004/0093505 A1 | 5/2004 | Hatakeyama et al. | |
| 2011/0022853 A1* | 1/2011 | Donie | G06F 21/78 713/190 |
| 2011/0246791 A1* | 10/2011 | Kambayashi | G06F 12/1408 713/193 |
| 2012/0233472 A1* | 9/2012 | Faraboschi | G06F 12/0246 713/190 |
| 2015/0058997 A1 | 2/2015 | Lee et al. | |
| 2015/0371063 A1* | 12/2015 | Van Antwerpen | G06F 21/80 713/190 |
| 2017/0085542 A1 | 3/2017 | Avanzi et al. | |

OTHER PUBLICATIONS

International Search Report and Written Opinion—PCT/US2016/034883—ISA/EPO—dated Feb. 2, 2017.
Suh E. G., et al., "AEGIS: Architecture for Tamper-Evident and Tamper-Resistant Processing", International Conference on Supercomputing (ICS), San Francisco, CA, Jun. 23-26, 2003, New York, NY: ACM, US, Jun. 23, 2003, XP058154989, pp. 160-171.

* cited by examiner

US 10,223,289 B2

SECURE HANDLING OF MEMORY CACHES AND CACHED SOFTWARE MODULE IDENTITIES FOR A METHOD TO ISOLATE SOFTWARE MODULES BY MEANS OF CONTROLLED ENCRYPTION KEY MANAGEMENT

CLAIM OF PRIORITY UNDER 35 U.S.C. § 119

The present application for Patent claims priority to U.S. Provisional Application No. 62/189,738 entitled "Secure Handling of Memory Caches and Cached Software Module Identities For A Method to Isolate Software Modules by Means of Controlled Encryption Key Management" filed Jul. 7, 2015, and assigned to the assignee hereof and hereby expressly incorporated by reference herein.

BACKGROUND

Field of the Disclosure

Aspects of the disclosure relate generally to secure memory management, and more specifically, but not exclusively, to secure handling of memory caches and cached software module identities for a method to isolate software modules by means of controlled encryption key management.

Description of Related Art

Software developers typically generate software (also referred to as a set of instructions, code, program, or algorithm), such as applications, drivers, and games, and allow customers and other authorized users to install and use the software in various products. For example, the software may be installed and stored in a memory device of an electronic device, such as a mobile phone (e.g., smartphone) or laptop computer. However, such software may be accessed and reverse engineered by unauthorized users (e.g., hackers), resulting in a loss of valuable intellectual property. Therefore, there is a need to protect the software in electronic products in order to prevent access of the software by unauthorized users.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

According to one aspect, a method operational on a cache memory device is provided. The cache memory device receives a request to read an instruction or data associated with a memory device, the request including at least a first realm identifier and a realm indicator bit, wherein the first realm identifier enables identification of a realm that includes one or more selected regions in the memory device. The term "realm" as used herein may be defined as one or more selected, pre-defined, or dynamically-defined memory regions(s), domains, segment(s), and/or block(s) of a memory device. The cache memory device determines whether the first realm identifier matches a second realm identifier in a cache tag when the instruction or data is stored in the cache memory device, where the instruction or data stored in the cache memory device has been decrypted based on an ephemeral encryption key associated with the second realm identifier when the first realm identifier indicates the realm and when the realm indicator bit is enabled. The cache memory device transmits the instruction or data when the first realm identifier matches the second realm identifier. In an aspect, the cache memory device refrains from transmitting the instruction when the first realm identifier does not match the second realm identifier. In an aspect, the ephemeral encryption key is a temporary or transitory encryption key that exists while the realm is maintained in the memory device. In an aspect, the request may include a control bit indicating whether access to data outside of a realm is allowed. In such aspect, the cache memory device determines whether to allow or deny the request based on at least the first realm identifier, the realm indicator bit, or the control bit, and refrains from transmitting the data or instructions when the request is denied. In an aspect, the request is allowed when the request is to read the data, the first realm identifier indicates the realm, the realm indicator bit is not enabled, and the control bit is enabled. In an aspect, the cache memory device defines the first realm identifier as zero when the request is to read the data, the first realm identifier indicates the realm, the realm indicator bit is not enabled, and the control bit is enabled. In an aspect, the cache memory device obtains the instruction or data from the memory device when the instruction or data is not stored in the cache memory device, and stores the obtained instruction or data at the cache memory device with a second cache tag including the first realm identifier. In an aspect, the instruction or data received from the memory device has been decrypted based on the ephemeral encryption key associated with the first realm identifier when the first realm identifier indicates the realm and when the realm indicator bit is enabled. In an aspect, the cache memory device receives a cache dump command, determines whether the second realm identifier in the cache tag is zero or a special value that indicates no realm when the instruction or data is stored in the cache memory device, and refrains from transmitting the instruction or data in response to the cache dump command when the second realm identifier in the cache tag is different from zero or a special value that indicates no realm. In an aspect, the cache memory device transmits zero values in response to the cache dump command when the second realm identifier in the cache tag is different from zero or the special value that indicates no realm. In an aspect, the cache memory device transmits the request and the first realm identifier to at least one remote cache memory in a same cluster of caches when the instruction or data is not stored in the cache memory device, and receives the instruction or data from the at least one remote cache memory device. In an aspect, the cache memory device transmits the request to at least one remote cache memory device in a different cluster of caches when the instruction or data is not stored in the cache memory device, and receives the instruction or data from the at least one remote cache memory device, where the received instruction or data is encrypted at a software protection device associated with the at least one remote cache memory device based on the ephemeral encryption key and is subsequently decrypted at a software protection device associated with the cache memory device based on the ephemeral encryption key prior to reception.

According to one aspect, an apparatus includes means for receiving a request to read an instruction or data associated with a memory device, the request including at least a first realm identifier and a realm indicator bit, where the first realm identifier enables identification of a realm that includes one or more selected regions in the memory device, means for determining whether the first realm identifier matches a second realm identifier in a cache tag when the instruction or data is stored in the apparatus, where the instruction or data stored in the apparatus has been decrypted based on an ephemeral encryption key associated with the second realm identifier when the first realm identifier indicates the realm and when the realm indicator bit is enabled, and means for transmitting the instruction or data when the first realm identifier matches the second realm identifier. In an aspect, the apparatus further includes means for refraining from transmitting the instruction when the first realm identifier does not match the second realm identifier. In an aspect, the apparatus further includes means for determining whether to allow or deny the request based on at least the first realm identifier, the realm indicator bit, or the control bit, and means for refraining from transmitting the data or instructions when the request is denied. In an aspect, the apparatus further includes means for defining the first realm identifier as zero when the request is to read the data, the first realm identifier indicates the realm, the realm indicator bit is not enabled, and the control bit is enabled. In an aspect, the apparatus further includes means for obtaining the instruction or data from the memory device when the instruction or data is not stored in the apparatus, and means for storing the obtained instruction or data at the apparatus with a second cache tag including the first realm identifier. In an aspect, the apparatus further includes means for receiving a cache dump command, means for determining whether the second realm identifier in the cache tag is zero or a special value that indicates no realm when the instruction or data is stored in the apparatus, and means for refraining from transmitting the instruction or data in response to the cache dump command when the second realm identifier in the cache tag is different from zero or a special value that indicates no realm. In an aspect, the apparatus further includes means for transmitting zero values in response to the cache dump command when the second realm identifier in the cache tag is different from zero or the special value that indicates no realm. In an aspect, the apparatus further includes means for transmitting the request and the first realm identifier to at least one remote cache memory in a same cluster of caches when the instruction or data is not stored in the apparatus, and receiving the instruction or data from the at least one remote cache memory device. In an aspect, the apparatus further includes means for transmitting the request to at least one remote cache memory device in a different cluster of caches when the instruction or data is not stored in the apparatus, and receiving the instruction or data from the at least one remote cache memory device, wherein the received instruction or data is encrypted at a software protection device associated with the at least one remote cache memory device based on the ephemeral encryption key and is subsequently decrypted at a software protection device associated with the cache memory device based on the ephemeral encryption key prior to reception.

According to one aspect, a method operational on a cache memory device is provided. The cache memory device receives a request to write data to a memory page associated with a region of a memory device, the request including at least a first realm identifier and a realm indicator bit, where the first realm identifier enables identification of a realm that includes one or more selected regions in the memory device. The cache memory device determines whether the memory page is stored at the cache memory device and determines whether a second realm identifier in a cache tag associated with the memory page matches the first realm identifier when the memory page is stored at the cache memory device. The cache memory device stores the data in the memory page at the cache memory device with a cache tag that includes the first realm identifier when the first realm identifier matches the second realm identifier. In an aspect, the cache memory device determines whether to allow or deny the request to write the data based on at least the first realm identifier, the realm indicator bit, or the control bit, and refrains from storing the data in the memory page at the cache memory device when the request is denied. In an aspect, the request to write the data is allowed when the first realm identifier indicates the realm, the realm indicator bit is not enabled, and the control bit is enabled. In an aspect, the cache memory device stores the data in the memory page at the cache memory device with a cache tag that includes the first realm identifier when the memory page is not stored at the cache memory device, where when the first realm identifier is not zero and the realm indicator bit is set for the memory page, the data is encrypted with an ephemeral encryption key associated with the first realm identifier after the cache memory device is flushed. In an aspect, the cache memory device defines the first realm identifier as zero or a special value that indicates no realm when the first realm identifier indicates the realm in the memory device, the realm indicator bit is not enabled, and the control bit is enabled. In an aspect, the cache memory device refrains from storing the data in the memory page at the cache memory device when the first realm identifier does not match the second realm identifier. In an aspect, the data stored in the memory page at the cache memory device when the first realm identifier matches the second realm identifier is encrypted using an ephemeral encryption key associated with the first realm identifier prior to storage in the region of the memory device corresponding to the memory page.

According to one aspect, an apparatus includes means for receiving a request to write data to a memory page associated with a region of a memory device, the request including at least a first realm identifier and a realm indicator bit, where the first realm identifier enables identification of a realm that includes one or more selected regions in the memory device, means for determining whether the memory page is stored at the cache memory device, means for determining whether a second realm identifier in a cache tag associated with the memory page matches the first realm identifier when the memory page is stored at the apparatus, and means for storing the data in the memory page at the apparatus with a cache tag that includes the first realm identifier when the first realm identifier matches the second realm identifier. In an aspect, the apparatus further includes means for determining whether to allow or deny the request to write the data based on at least the first realm identifier, the realm indicator bit, or the control bit, and means for refraining from storing the data in the memory page at the cache memory device when the request is denied. In an aspect, the apparatus further includes means for storing the data in the memory page at the cache memory device with a cache tag that includes the first realm identifier when the memory page is not stored at the cache memory device, where when the first realm identifier is not zero and the realm indicator bit is set for the memory page, the data is encrypted with an ephemeral encryption key associated with the first realm identifier after the cache memory device is flushed. In an aspect, the apparatus further includes means for defining the first realm identifier as zero or a special value that indicates no realm when the first realm identifier indicates the realm in the memory device, the realm indicator bit is not enabled, and the control bit is enabled. In an aspect, the apparatus further includes means for refraining from storing the data in the memory page at the cache memory device when the first realm identifier does not match the second realm identifier.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

Figure 1:
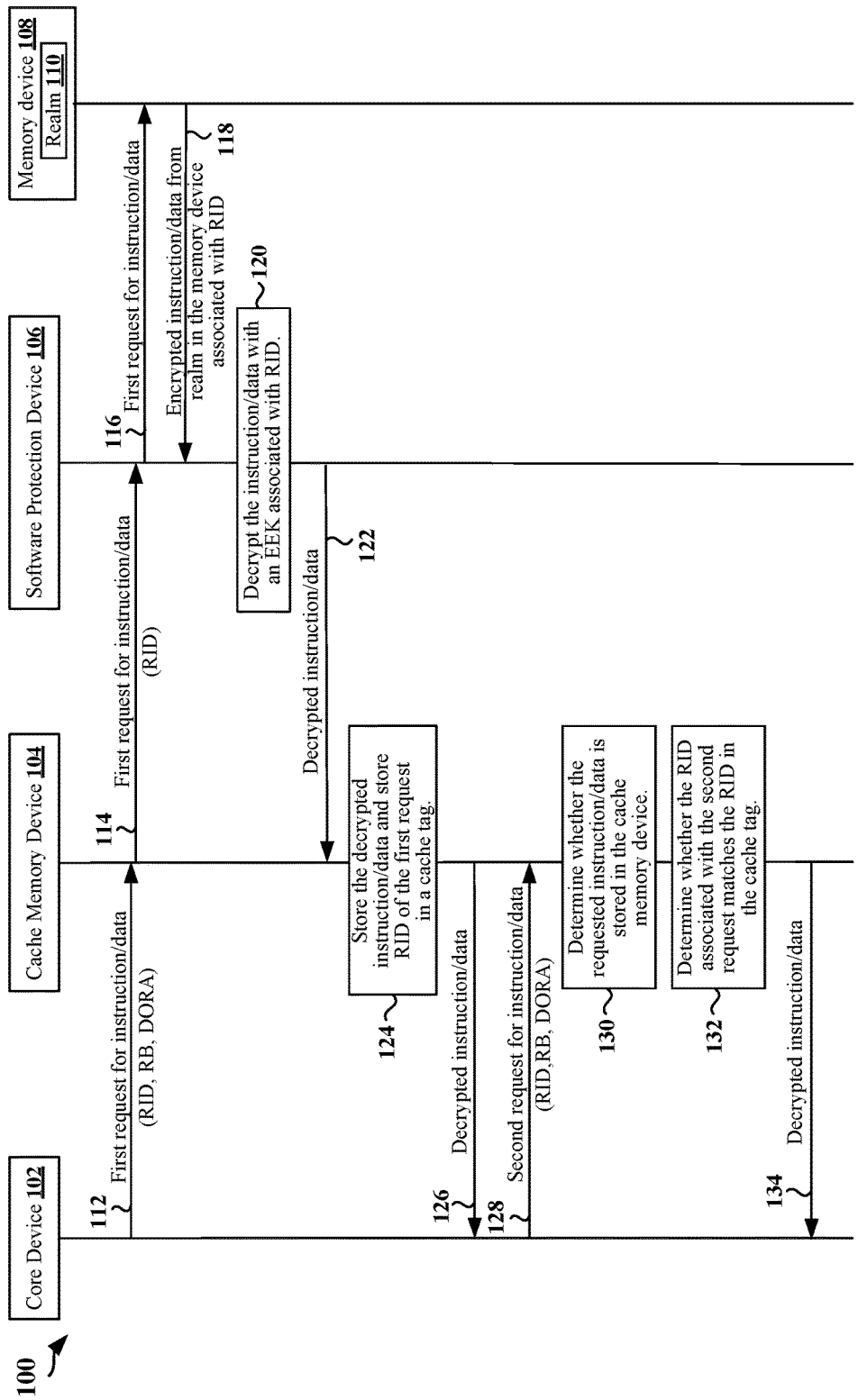
FIG. 1 is an exemplary signal flow diagram showing an example operation for reading instructions/data from a memory device in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Overview

The present disclosure refers to apparatuses, methods, and computer-readable mediums including instructions for secure memory transactions at a cache memory device in an architecture implementing a software protection device. The software protection device (e.g., software protection device 408 in FIG. 4) may be a hardware device configured to protect software (e.g., target software 318 in FIG. 3) stored in a memory device (e.g., memory device 410 in FIG. 4). For example, the memory device may be in communication with a core device (e.g., core device 402 in FIG. 4) of a central processing unit (CPU) and may store the protected software to be executed by the core device. The software protection device may protect software (e.g., from attackers that may gain control of hardware and/or software) by generating a realm (e.g., realm 428 in FIG. 4) in the memory device and associating a unique realm identifier (RID) with the realm. The term "realm" as used herein may be defined as one or more selected, pre-defined, or dynamically-defined memory regions(s), domains, segment(s), and/or block(s) of a memory device. For example, memory regions in the memory device included in a realm may be indicated or referenced as a set of memory pages associated with the memory device. In one example, the memory device may be a volatile memory device (e.g., a random-access memory (RAM) device). In one aspect, an RID may be a unique binary string. In other aspects, an RID may be any combination of numbers, letters, and/or symbols. The software protection device may encrypt/decrypt memory transactions (e.g., a memory command or operation for reading from or writing to the memory device, or for fetching an instruction from the memory device for execution by a core device) between the core device and the memory device to maintain the security of the software stored in the realm.

Figure 4:
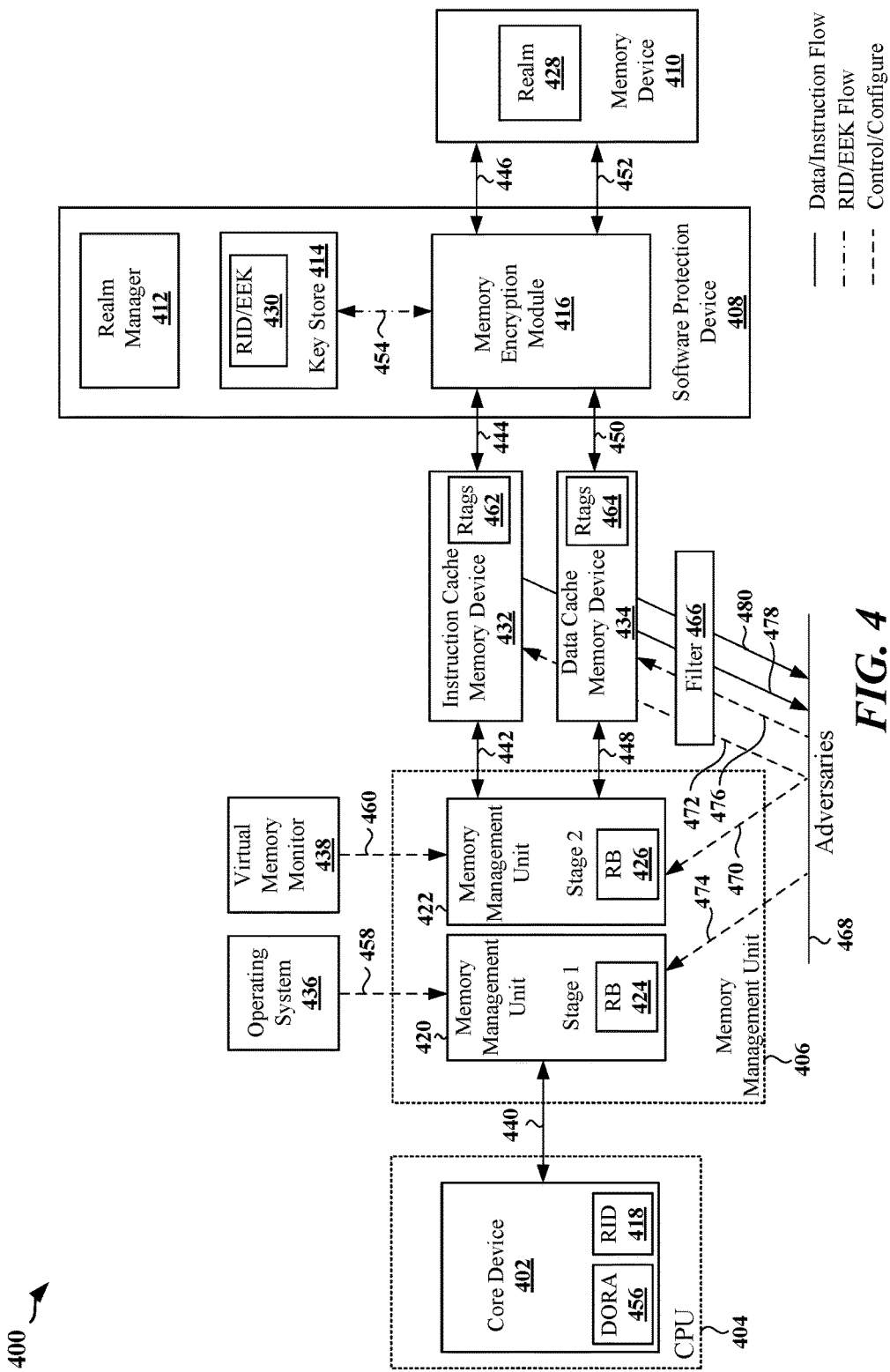
FIG. 4 is a block diagram of an example architecture in accordance with various aspects of the present disclosure.

In an aspect, with reference to FIG. 4, a cache memory device (e.g., instruction cache memory device 432 or data cache memory device 434) may be implemented by the core device 402 when performing memory transactions with the memory device 410. In an aspect, a cache memory device may receive a request to read an instruction or data associated with the memory device, the request including at least a first RID and a realm indicator bit, where the first RID enables identification of a realm that includes one or more selected regions in the memory device. The cache memory device may determine whether the first realm identifier matches a second realm identifier in a cache tag when the instruction or data is stored in the cache memory device. In an aspect, the instruction or data stored in the cache memory device has been decrypted at the software protection device based on an ephemeral encryption key associated with the second realm identifier when the first realm identifier indicates the realm and when the realm indicator bit is enabled.

The cache memory device may then transmit the instruction or data when the first realm identifier matches the second realm identifier.

In another aspect, a cache memory device may receive a request to write data to a memory page associated with a region of a memory device, the request including at least a first RID and a realm indicator bit, where the first realm identifier enables identification of a realm that includes one or more selected regions in the memory device. The cache memory device may determine whether the memory page is stored at the cache memory device and may determine whether a second realm identifier in a cache tag associated with the memory page matches the first realm identifier when the memory page is stored at the cache memory device. The cache memory device may store the data in the memory page at the cache memory device with a cache tag that includes the first realm identifier when the first realm identifier matches the second realm identifier.

Exemplary Signal Flow Diagrams

FIG. 1 is an exemplary signal flow diagram 100 showing an example operation for reading an instruction or data from a memory device in accordance with various aspects of the present disclosure. As shown in FIG. 1, the signal flow diagram 100 includes a core device 102, a cache memory device 104, a software protection device 106, and a memory device 108. In an aspect, the memory device 108 may include a realm 110. In one aspect of the present disclosure, the realm 110 may be represented as one or more memory pages associated with regions in the memory device 108 that contain protected (e.g., encrypted) instructions and/or data. In an aspect, the realm 110 may be associated with a realm identifier (RID).

As shown in FIG. 1, the core device 102 may transmit 112 a first request for an instruction or data from the memory device 108. The first request may include an RID, a realm indicator bit (RB) (e.g., provided by a memory management unit (MMU)), and an optional control bit (also herein referred to as a "data outside realm allowed" (DORA) bit). The realm indicator bit may be a bit in a memory page descriptor of a memory page that indicates whether or not that memory page belongs to a realm (e.g., realm 210) in the memory device 208. The cache memory device 104 may determine that the request is allowed based on the RID, RB, and DORA bit and may forward 114 the request to the software protection device 106. The software protection device 106 may forward 116 the request to the memory device 108 and may receive 118 an encrypted instruction or data from the memory device 108. The software protection device 106 may decrypt 120 the instruction or data with an ephemeral encryption key (EEK) that is associated with the RID in the first request transmitted by the core device 102. The software protection device 106 may transmit 122 the decrypted instruction or data to the cache memory device 104. The cache memory device 104 may store 124 the decrypted instruction or data and may store the RID of the first request transmitted by the core device 102 in a cache tag. The cache memory device 104 may transmit 126 the requested instruction or data (e.g., in decrypted form) to the core device 102. The core device 102 may transmit 128 a second request for an instruction or data from a region in the memory device 108. The second request may include an RID, a realm indicator bit (RB) (e.g., provided by an MMU), and an optional DORA bit. The cache memory device 104 may determine that the second request is allowed based on the RID, RB, and DORA bit of the second request and may determine 130 whether the requested instruction or data is stored in the cache memory device 104. The cache memory device 104 may determine 132 whether the RID in the second request matches the RID in the cache tag when the requested instruction or data is stored in the cache memory device 104. The cache memory device 104 may transmit 134 the requested instruction or data (e.g., in decrypted form) to the core device 102 when the RID of the second request matches the RID in the cache tag. Otherwise, if the RID of the second request does not match the RID in the cache tag, the cache memory device 104 may refrain from transmitting the requested instruction or data to the core device 102.

Figure 2:
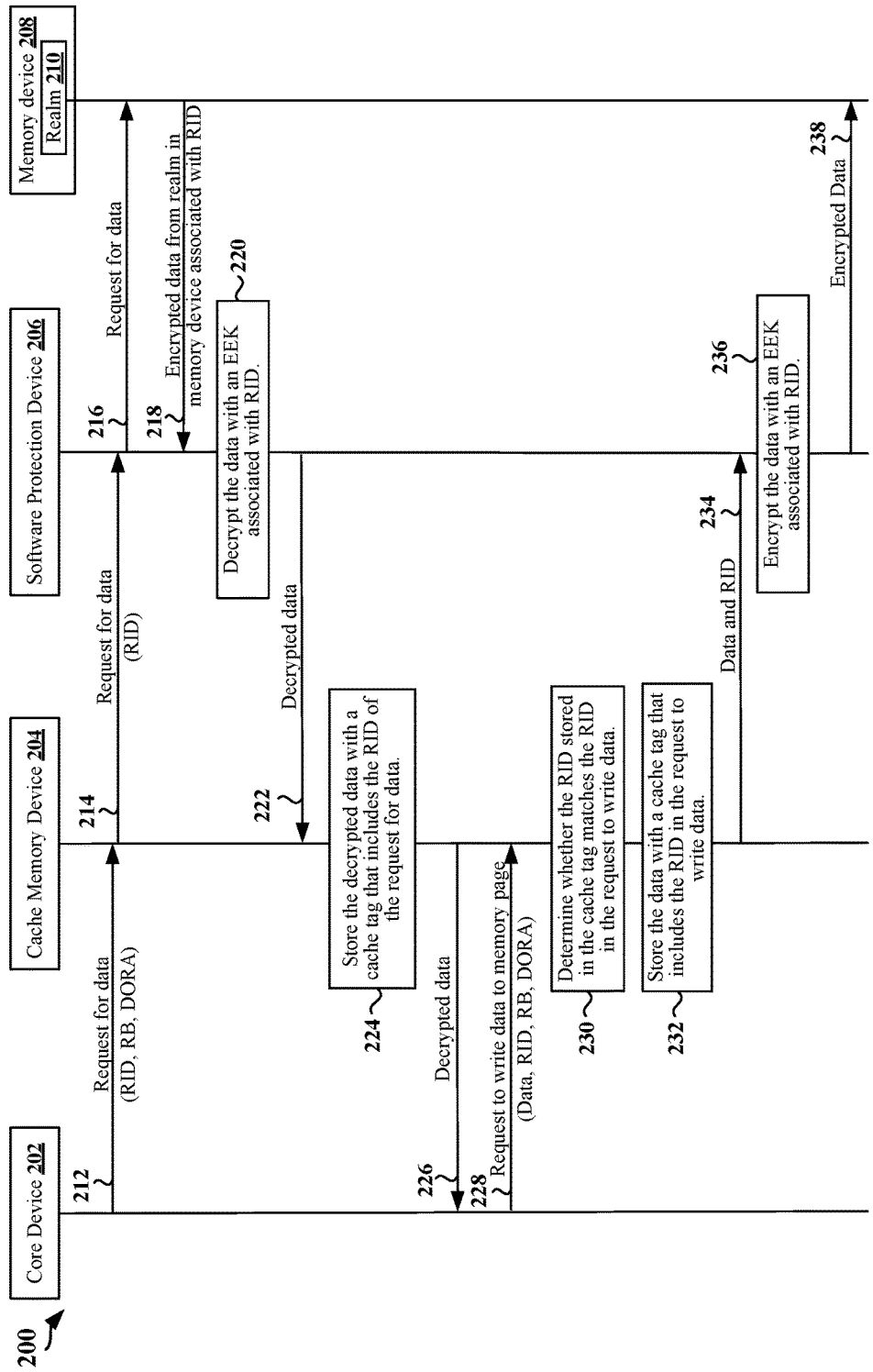
FIG. 2 is an exemplary signal flow diagram showing an example operation for writing data to a memory device in accordance with various aspects of the present disclosure.

FIG. 2 is an exemplary signal flow diagram 200 showing an example operation for writing data to a memory device in accordance with various aspects of the present disclosure. As shown in FIG. 2, the signal flow diagram 200 includes a core device 202, a cache memory device 204, a software protection device 206, and a memory device 208. In an aspect, the memory device 208 may include a realm 210. In an aspect of the present disclosure, the realm 210 may be represented as one or more memory pages associated with regions in the memory device 208 that contain protected (e.g., encrypted) instructions and/or data. In an aspect, the realm 210 may be associated with an RID.

As shown in FIG. 2, the core device 202 may transmit 212 a request for an instruction or data from the memory device 208. The request may include an RID, a realm indicator bit (RB) (e.g., provided by an MMU), and an optional DORA bit. The cache memory device 204 may determine that the request is allowed based on the RID, RB, and DORA bit and may forward 214 the request to the software protection device 206. The software protection device 206 may forward 216 the request to the memory device 208 and may receive 218 an encrypted instruction or data from the memory device 208. The software protection device 206 may decrypt 220 the instruction or data with an ephemeral encryption key (EEK) that is associated with the RID of the request for the instruction or data transmitted by the core device 202. The software protection device 206 may transmit 222 the decrypted instruction or data to the cache memory device 204. The cache memory device 204 may store 224 the decrypted instruction or data and may store the RID of the request for the instruction or data in a cache tag. The cache memory device 204 may transmit 226 the requested instruction or data (e.g., in decrypted form) to the core device 202.

The core device 202 may transmit 228 a request to write data to a region (e.g., a memory page) in the memory device 208. The request may include an RID, a realm indicator bit (RB), and an optional DORA bit. The cache memory device 204 may determine 230 whether an RID in a cache tag associated with the memory page matches the RID of the request to write data when the memory page is stored at the cache memory device. The cache memory device 204 may store 232 the data in the memory page at the cache memory device with a cache tag that includes the RID of the request to write data when the RID of the request to write data matches the RID in the cache tag. When the cache memory device 204 is flushed, the cache memory device 204 may transmit 234 the data to be written along with the RID in the cache tag to the software protection device 206. The software protection device 206 may encrypt 236 the data based on an EEK associated with the RID and may transmit 238 the encrypted data to the memory device 208 for storage in the realm associated with the RID.

Figure 3:
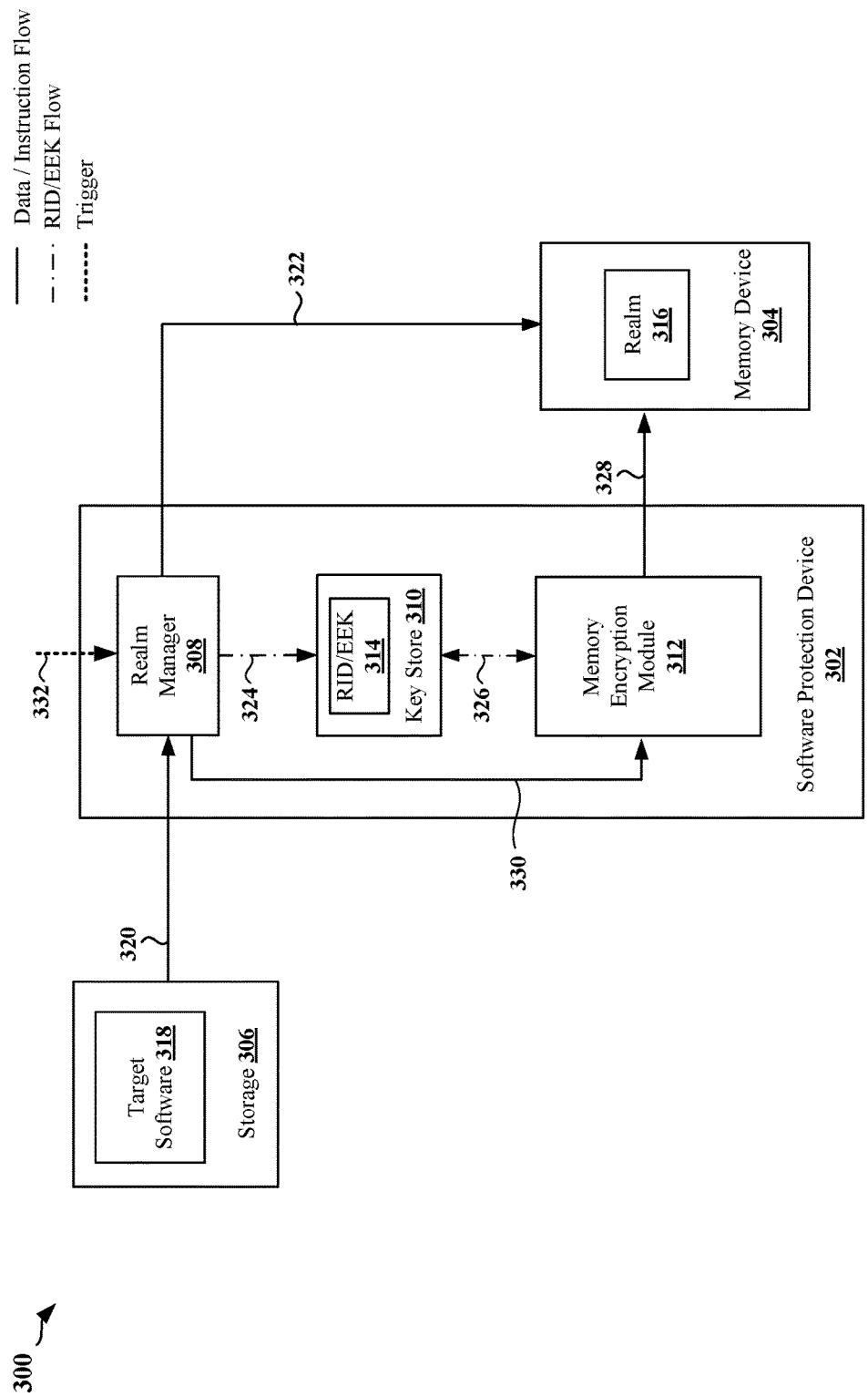
FIG. 3 is a block diagram of an example architecture in accordance with various aspects of the present disclosure.

FIG. 3 is a block diagram of an example architecture 300 in accordance with various aspects of the present disclosure. For example, the architecture 300 may be implemented in a computing device, such as a personal computer, cell phone (also referred to as a user equipment (UE)), or a handheld gaming device. As shown in FIG. 3, the architecture 300 includes a software protection device 302, a memory device 304, and a storage 306. As further shown in FIG. 3, the software protection device 302 may include a realm manager 308, a key store 310, and a memory encryption module 312. In an aspect of the present disclosure, the realm manager 308 may be implemented as an application in a secure processor, as a separate core device, or as a hardware block. For example, the realm manager 308 may use a crypto coprocessor to offload heavy tasks. In an aspect of the present disclosure, the memory device 304 may serve as a main memory that is configured to load and store instructions for execution by a central processing unit (CPU) (not shown in FIG. 3 for ease of illustration). For example, the memory device 304 may be a volatile memory device, such as a random access memory (RAM), a cache memory device, or any other suitable type of memory device.

In one aspect of the present disclosure, the storage 306 may be configured to store valuable or sensitive software, such as the target software 318. In one aspect of the present disclosure, the target software 318 may be proprietary software that includes instructions and/or data. For example, the instructions and/or data may include a stack, a heap, and/or metadata. In one aspect, the target software 318 may be a software module. In an aspect of the present disclosure, the storage 306 may be any suitable storage device. In one example, the storage 306 may be local memory (e.g., a memory of another CPU). In another example, the storage 306 may be a local non-volatile storage device, such as a flash memory, an embedded MultiMediaCard (eMMC), Secure Digital (SD) card, a USB drive, optical disc, or magnetic disk. In another example, the storage 306 may be a remote storage accessible through a network.

In an aspect of the present disclosure, the software protection device 302 is a hardware architecture configured to protect software, such as the target software 318 (e.g., the instructions and/or data associated with the target software 318). For example, the software protection device 302 may protect the target software 318 from a variety of attackers (e.g., hackers) that may gain control of various hardware and/or software in a device. In an aspect of the present disclosure, various features of the software protection device 302 may be incorporated into a software development kit (SDK) to allow third party developers to protect their software. The software protection device 302 may be implemented without a substantial impact on tools and host environment.

In an aspect of the present disclosure, configuration of a software protection device (e.g., software protection device 302) as disclosed herein may be outside the control of original equipment manufacturers (OEMs). In such aspect, the software protection device may not restrict the ability of an OEM or other parties (e.g., third party software developers) to install any software in the memory device 304. The software protection device may not require specific execution by an OEM or third parties. In an aspect, a software protection device (e.g., software protection device 302) may be scalable (any number of core devices) and may be used with various types of core devices. In an aspect, the architecture 300 (or the architectures 400, 600 discussed below) may protect the target software 318 (e.g., the instructions and/or data of the target software 318) based on memory encryption of the target software 318 and not based on access control of a memory device (e.g., memory device 304).

Establishment of a Realm in a Memory Device

As shown in FIG. 3, the realm manager 308 of the software protection device 302 may generate one or more realms (e.g., the realm 316) in the memory device 304. In one example, the realm manager 308 may generate the realm 316 in the memory device 304 in response to a trigger, such as a realm establishment command 332. In one example, the realm establishment command 332 may be implemented as a remote procedure call (RPC) from a CPU (not shown in FIG. 3 for ease of illustration). In another example, the realm establishment command 332 may be a command of a startup sequence for the realm manager 308. The realm establishment command 332 may include various items of information. In one aspect of the present disclosure, the realm establishment command 332 may include the location (e.g., memory address) of the target software 318 in the storage 306, the location (e.g., memory address) of the realm 316 in the memory device 304, and/or the location of one or more keys that may be used to verify and/or remove any cryptographic protection applied to the instructions and/or data of the target software 318.

In response to receiving the realm establishment command 332, the realm manager 308 may generate a realm identifier (RID) for the realm 316 and an ephemeral encryption key (EEK) for the realm 316. In one aspect, the EEK is a temporary or transitory encryption key that exists while the realm 316 is maintained in the memory device 304. In one aspect of the present disclosure, the RID and the EEK may be unique to realm 316 and may not be associated with any other realms that may be established in the memory device 304. In one aspect of the present disclosure, the realm manager 308 may store the RID and the corresponding EEK (e.g., shown in FIG. 3 as the RID/EEK pair 314) in the key store 310 through the exclusive interface 324. In an aspect of the present disclosure, the RID may be disclosed to entities outside of the software protection device 302, while the EEK may not be known to any entity outside of the software protection device 302. In an aspect of the present disclosure, the RID, the EEK, and their association may be modified within the software protection device 302 and may not be modified by any entity external to the software protection device 302.

As shown in FIG. 3, the realm manager 308 may obtain all or at least some of the instructions and/or data of the target software 318 through the transmission 320 from the storage 306. In an aspect of the present disclosure, the realm manager 308 may obtain all or at least some of the instructions and/or data of the target software 318 by reading the location (e.g., memory address) of the target software 318 in the storage 306, in which case the transmission 320 may be received by the realm manager 308 in response to a read operation. In an aspect of the present disclosure, the target software 318 stored in the storage 306 may be protected. In one example, the target software 318 may be in plain text form and physically protected, in which case the storage 306 may be configured as a secure storage (e.g., on-chip storage, in-package storage, etc.). In another example, the target software 318 may be cryptographically protected (e.g., encrypted and/or authenticated). In such example, the realm manager 308 may obtain a file that includes the target software 318 from the storage 306 and may access one or more keys (e.g., one or more permanent keys) used to apply the cryptographic protection to the target software 318. The realm manager 308 may proceed to verify and/or remove (e.g., decrypt) the cryptographic protection using the one or more keys. After the cryptographic protection is removed, the realm manager 308 may then encrypt the instructions and/or data of the target software 318 using the EEK of the RID/EEK pair 314 and may store the encrypted instructions and/or data of the target software 318 in the realm 316 of the memory device 304.

In one example, the realm manager 308 may achieve the encryption of the instructions and/or data of the target software 318 by implementing an encryption function within the realm manager 308, and implementing a direct interface 322 between the realm manager 308 and the memory device 304. In another example, the realm manager 308 may achieve the encryption of the instructions and/or data of the target software 318 by implementing the memory encryption module 312 of the software protection device 302 via the interface 330. In such example, the realm manager 308 may provide the RID associated with the realm 316 to the memory encryption module 312. The memory encryption module 312 may retrieve the EEK associated with the RID from the key store 310 via the exclusive interface 326. The memory encryption module 312 may proceed to encrypt the instructions and/or data of the target software 318 and may transmit the encrypted instructions and/or data 328 for storage in the realm 316 of the memory device 304. It should be understood that the encrypted form of the target software 318 (e.g., the encrypted form of the instructions and/or data of the target software 318) in the realm 316 prevents a core device (not shown in FIG. 3) from being able to execute the target software 318.

In an aspect of the present disclosure, the encryption scheme used to encrypt the target software 318 based on the EEK may be physical address dependent. In such aspect, if the realm 316 is later relocated in the memory device 304 from a first physical address to a second physical address, the realm manager 308 may initiate decryption of the contents of the realm 316 using the EEK of the RID/EEK pair 314 and the first physical address. The realm manager 308 may then initiate re-encryption of the contents of the realm 316 using the EEK of the RID/EEK pair 314 and the second physical address. In an aspect of the present disclosure, the EEK of the RID/EEK pair 314 may be valid (e.g., exists) during the period when instructions in a memory page of a realm (e.g., realm 316) protected with the EEK are being executed by a core device (e.g., core device 402 discussed below), and the EEK may no longer be valid (e.g., deleted) after the instructions in the memory page of the realm have been executed.

Execution of a Realm in a First Example Architecture

FIG. 4 is a block diagram of an example architecture 400 in accordance with various aspects of the present disclosure. For example, the architecture 400 may be implemented in a computing device, such as a personal computer, cell phone (also referred to as a user equipment), or a handheld gaming device. As shown in FIG. 4, the architecture 400 includes a core device 402, a memory management unit (MMU) 406, a software protection device 408, and a memory device 410. For example, the core device 402 may be a processor in a central processing unit (CPU) 404. In an aspect, the software protection device 408 may include a realm manager 412, a key store 414, and a memory encryption module 416. In other aspects, the MMU 406 may be included in the CPU 404. In an aspect of the present disclosure, the software protection device 408, the memory device 410, the realm manager 412, the key store 414, and the memory encryption module 416 in FIG. 4 may respectively correspond to the software protection device 302, the memory device 304, the realm manager 308, the key store 310, and the memory encryption module 312 in FIG. 3.

Core Device Operations for Realm Execution

In one aspect of the present disclosure, the core device 402 may initiate a memory transaction with respect to the memory device 410 by transmitting a memory command to the MMU 406. In one example, the memory command may be configured to execute a data read transaction for reading data from the memory device 410 or may be configured to execute a data write transaction for writing data to the memory device 410. In another example, the memory command may be configured to execute an instruction fetch transaction (also referred to as an instruction read transaction) for fetching an instruction from the memory device 410.

In one aspect of the present disclosure, after the realm 428 has been established and the encrypted instructions and/or data of the target software 318 have been stored in the realm 428 in a manner previously described, the core device 402 may enter the realm 428 to read data from the realm 428, write data to the realm 428, or fetch an instruction from the realm 428. Accordingly, in such aspect, the core device 402 may support an instruction for entering the realm 428 by referencing the RID corresponding to the realm 428. The core device 402 may further support an instruction for exiting the realm 428. In an aspect of the present disclosure, the core device 402 may include an RID register 418 that is configured to store an RID. The RID register 418 may not be visible to any software. In one example, the RID register 418 may indicate that no realm is being referenced or identified when a zero value or other special value is stored in the RID register 418. For example, an instruction for entering the realm 428 may set the RID value corresponding to the realm 428 in the RID register 418 and may allow a jump to the beginning of the realm 428. In one aspect of the present disclosure, an instruction for exiting a realm may restore a previous state (e.g., prior to entering the realm 428) in the memory device 410. In such example, the core device 402 may clear the RID value corresponding to the realm 428 in the RID register 418.

In one aspect of the present disclosure, each memory transaction between the core device 402 and the memory device 410 may be tagged to include the RID currently stored in the RID register 418, the type of memory transaction, and an optional control bit. For example, the RID currently stored in the RID register 418 may be a unique binary string associated with the realm 428. For example, the type of memory transaction (e.g., data or instruction) may be indicated using a single bit. In such example, the value '1' may indicate a data read/write transaction and the value '0' may indicate an instruction fetch transaction. In an aspect of the present disclosure, the RID currently stored in the RID register 418 and the optional control bit are protected against modification by untrusted software. In one scenario, for example, when the core device 402 executes an instruction for entering the realm 428 and the RID register 418 includes the RID corresponding to the realm 428, memory transactions (e.g., data read/write transaction or an instruction fetch transaction) between the core device 402 and the memory device 410 may be tagged to include the RID in the RID register 418 and the optional control bit. The optional control bit may allow or prevent a memory transaction for reading data from or writing data to a region of the memory device 410 that is outside of the realm 428 (also referred to as a non-realm region of the memory device 410). For example, the core device 402 may configure the optional control bit to allow or prevent limited access to non-realm regions of the memory device 410. In one aspect, such limited access may enable the reading or writing of data, but not fetching instructions, from the non-realm regions of the memory device 410. The optional control bit is also herein referred to as a "data outside realm allowed" (DORA) bit 456. In an aspect of the present disclosure, the DORA bit 456 may not be visible to any software. For example, the core device 402 may allow a memory transaction for reading from a non-realm region of the memory device 410 by temporarily enabling the DORA bit 456 (e.g., setting the DORA bit 456 to '1'). In another example, the core device 402 may prevent a memory transaction for reading from a non-realm region of the memory device 410 by temporarily disabling the DORA bit 456 (e.g., setting the DORA bit 456 to '0'). In one aspect of the present disclosure, when the DORA bit 456 is enabled (e.g., set to '1') to allow a memory transaction for reading data from or writing data to a non-realm region (also referred to as a non-realm page) of the memory device 410, reading of instructions from a non-realm region of the memory device 410 may not be permitted. In order to initiate a memory transaction, the core device 402 may include the RID in the RID register 418, the type of memory transaction (e.g., data or instructions), and the optional DORA bit 456 in a memory command (e.g., for initiating a data read/write transaction or an instruction fetch transaction) and may transmit the memory command to the MMU 406.

Memory Management Unit (MMU) Operations for Realm Execution

In accordance with various aspects of the present disclosure, the MMU 406 may be configured for a single stage of address translation or for multiple stages of address translation. In the example configuration shown in FIG. 4, the MMU 406 includes multiple stages of address translation, such as a first address translation stage (also referred to as MMU stage 1 420) and a second address translation stage (also referred to as MMU stage 2 422). In one example, the MMU stage 1 420 may be configured to translate virtual memory addresses to intermediate physical memory addresses. Accordingly, the MMU stage 1 420 may maintain a memory page table (e.g., mapping between virtual addresses and intermediate addresses) and may include a realm indicator bit (RB) 424 in memory pages belonging to a realm. For example, each memory page corresponding to a realm in the memory device 410 may be marked as a "realm page" using the RB 424. Therefore, the RB 424 may allow the MMU 406 to identify whether a memory page belongs to the realm 428. The MMU stage 2 422 may be configured to translate intermediate physical memory addresses to physical memory addresses of the memory device 410. Accordingly, the MMU stage 2 422 may maintain a memory page table (e.g., mapping between intermediate addresses and physical addresses) and may include a realm indicator bit (RB) 426 in memory pages belonging to a realm. For example, each memory page corresponding to a realm in the memory device 410 may be marked as a "realm page" using the RB 426. Therefore, the RB 426 may allow the MMU 406 to identify whether a memory page belongs to the realm 428. Therefore, any memory page for which the RB 424 or RB 426 is enabled (e.g., the RB 424 or RB 426 is set to '1') may be considered to be a memory page belonging to the realm 428. In one aspect of the present disclosure, the operating system (OS) 436 may control 458 the mapping of virtual memory addresses to intermediate physical memory addresses, and the virtual memory monitor (VMM) 438 may control 460 the mapping of intermediate physical addresses to physical memory addresses. It should be understood that in other aspects, the MMU 406 may include more than two stages of address translation.

As shown in FIG. 4, the MMU 406 is coupled to an instruction cache memory device (I-Cache) 432 and a data cache memory device (D-Cache) 434. As further shown in FIG. 4, the instruction cache memory device 432 and data cache memory device 434 are coupled to the software protection device 408. In the configuration of FIG. 4, it should be noted that the MMU 406 may communicate with the instruction cache memory device 432 via the instruction flow 442 without any intervening encryption/decryption operations performed by the memory encryption module 416 of the software protection device 408. The MMU 406 may also communicate with the data cache memory device 434 via the data flow 448 without any intervening encryption/decryption operations performed by the memory encryption module 416 of the software protection device 408.

In an aspect of the present disclosure, the MMU 406 may receive a memory transaction (e.g., a memory command for initiating a data read/write transaction or an instruction fetch transaction) from the core device 402. The memory transaction may include a memory transaction address (e.g., a memory address from which data or an instruction is to be read, or to which data is to be written) that is associated with the memory device 410. The MMU 406 may determine a memory page corresponding to the memory transaction address and may determine the value (e.g. '0' or '1') of the realm indicator bit (e.g., RB 424 or RB 426) for the memory page. The MMU 406 may include the value of the realm indicator bit in the memory transaction received from the core device 402 and may forward the memory transaction along with the RID 418 (e.g., the value currently stored in the RID register 418), the optional DORA bit 456, and the value of the realm indicator bit to a cache memory device. In one example, the MMU 406 may determine that the memory transaction is an instruction fetch transaction and may forward such memory transaction (including the RID 418, the optional DORA bit 456, and the value of the realm indicator bit) to the instruction cache memory device 432 via the instruction flow 442. In another example, the MMU 406 may determine that the memory transaction is a data transaction (e.g., data read or data write transaction) and may forward the memory transaction (including the RID 418, the optional DORA bit 456, and the value of the realm indicator bit) to the data cache memory device 434 via the data flow 448. In one aspect, the MMU 406 may not translate and/or modify the RID 418 and the optional DORA bit 456 in a memory transaction.

In an aspect, when the realm indicator bit (e.g., RB 424 or RB 426) for a memory page is not enabled (e.g., the RB 424 or RB 426 is set to '0'), the MMU 406 may check whether the RID included in the memory transaction indicates a realm. For example, the MMU 406 may determine that the RID included in the memory transaction indicates a realm when the RID is not zero or when the RID is not a predetermined special value that indicates no realm. In this aspect, if the realm indicator bit for a memory page is not enabled and the RID included in the memory transaction indicates a realm, the MMU 406 may fault or force the core device 402 out of the realm 428 (e.g., force the core device 402 to quit the realm 428). In one aspect of the present disclosure, the realm 428 may be extended by setting a realm indicator bit (e.g., RB 424 or RB 426) for one or more additional memory pages. In an aspect, if the realm indicator bit is manipulated (e.g., if the value of the RB 424 or RB 426 is changed for a memory page by an untrusted entity or software), any data and/or instructions read from the realm 428 will be in a form (e.g., in an encrypted form) that prevents processing by the core device 402.

Cache Memory Device Operations for Realm Execution

In the aspect of FIG. 4, the MMU 406 is coupled to an instruction cache memory device (I-Cache) 432 and a data cache memory device (D-Cache) 434. For example, the core device 402 may fetch instructions from the instruction cache memory device 432 and may read data from (or write data to) the data cache memory device 434. As shown in FIG. 4, the instruction cache memory device 432 and data cache memory device 434 are coupled to the software protection device 408. In one aspect of the present disclosure, the instruction cache memory device 432 and the data cache memory device 434 may be referred to as a level 1 (L1) cache. In such aspect, the software protection device 408 in FIG. 4 may be said to be situated after the L1 cache. In other aspects, the software protection device 408 may be situated between a level 2 (L2) cache and a level 3 (L3) cache. In yet other aspects, the software protection device 408 may be situated between an L3 cache (or a last cache level before the memory device 410) and the memory device 410. It should be understood that the aspects described herein with respect to an instruction cache memory device (e.g., an instruction cache memory device (I-Cache) 432) and a data cache memory device (e.g., a data cache memory device (D-Cache) 434) may be applied to a single cache memory device (also referred to as a unified cache memory device) configured to store both data and instructions.

In one aspect of the present disclosure, and as described in detail herein, the instruction cache memory device 432 may store instructions fetched from the memory device 410 and the corresponding memory locations (e.g., memory pages corresponding to regions in the memory device 410) of the fetched instructions. For example, the instructions stored in the instruction cache memory device 432 may be instructions previously requested by the core device 402 as a result of a prior instruction fetch memory transaction.

In another aspect of the present disclosure, and as described in detail herein, the data cache memory device 434 may store data read from the memory device 410 and the corresponding memory locations (e.g., memory pages corresponding to regions in the memory device 410) of the read data. For example, the data stored in the data cache memory device 434 may be data previously requested by the core device 402 as a result of a prior data read memory transaction. The data cache memory device 434 may further store data to be written to the memory device 410 and the corresponding memory locations (e.g., memory pages corresponding to regions in the memory device 410) where the data is to be written. For example, the data stored in the data cache memory device 434 may be data previously transmitted by the core device 402 as a result of a prior data read (or data write) memory transaction.

i) Determination to Allow or Deny a Memory Transaction

Figure 5:
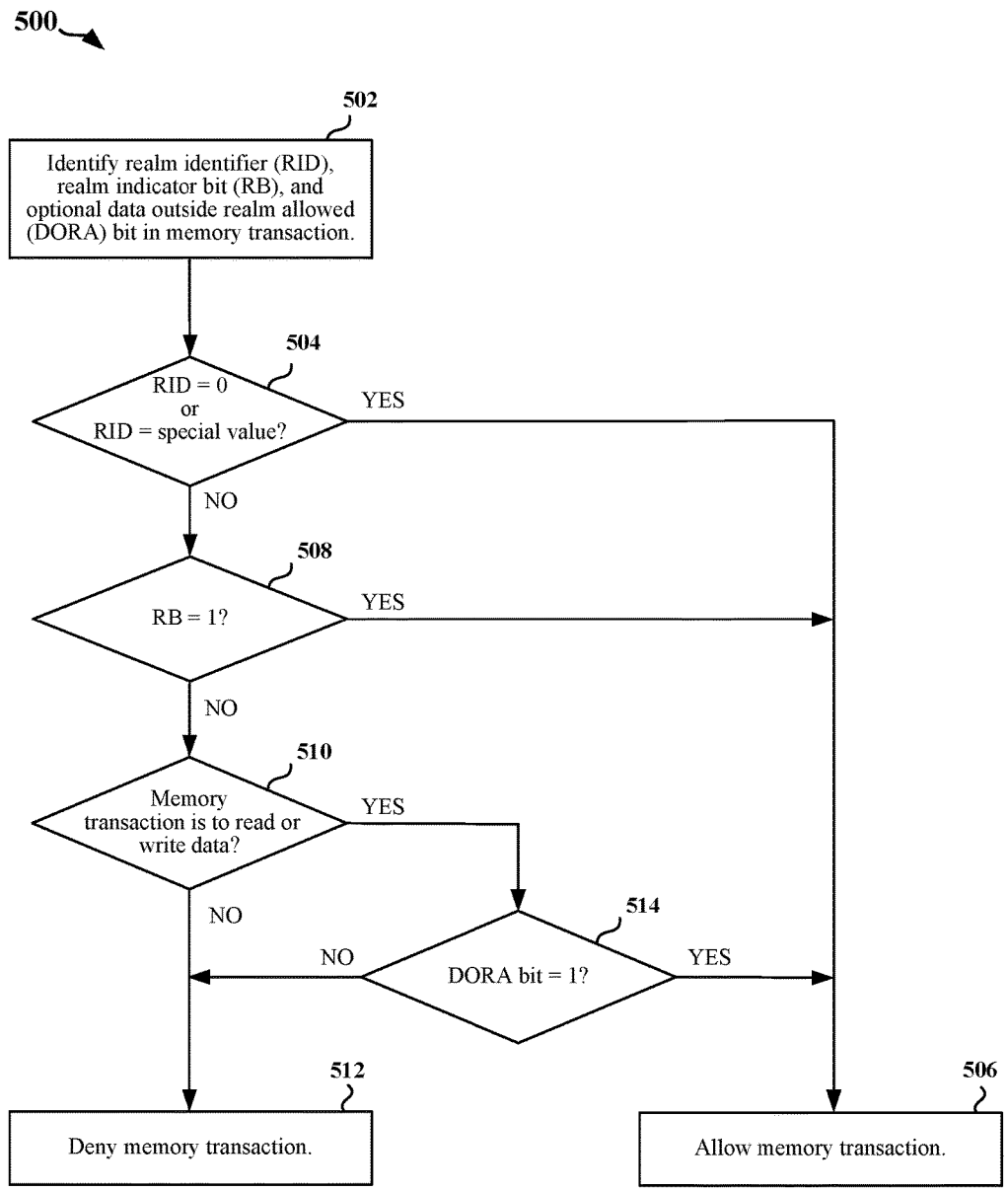
FIG. 5 is a flow diagram illustrating operations to determine whether to allow or deny a memory transaction in accordance with various aspects of the present disclosure.

In one aspect of the present disclosure, when a cache memory device (e.g., the instruction cache memory device 432 or the data cache memory device 434) receives a memory transaction, the cache memory device may determine whether to allow or deny the memory transaction. For example, the memory transaction may be an instruction fetch transaction or a data read/write transaction initiated by the core device 402 with respect to the memory device 410. The operations of a cache memory device for determining whether to allow or deny a memory transaction will be described with respect to the example flow diagram 500 of FIG. 5. Accordingly, with reference to FIG. 5, when the cache memory device receives a memory transaction, the cache memory device may identify 502 the RID (e.g., the value currently stored in the RID register 418) included in the memory transaction, the realm indicator bit (e.g., RB 424 or RB 426) included in the memory transaction, and the optional DORA bit (e.g., DORA bit 456) included in the memory transaction. The cache memory device may determine 504 whether the RID is zero or a predetermined special value that indicates no realm. If the RID is zero or a predetermined special value that indicates no realm, the cache memory device may allow 506 the memory transaction. Otherwise, if the RID is not zero or a predetermined special value, the cache memory device may determine 508 whether the realm indicator bit is enabled (e.g., whether the realm indicator bit is set to '1'). If the realm indicator bit is enabled, the cache memory device may allow 506 the memory transaction. Otherwise, if the realm indicator bit is not enabled, the cache memory device may determine 510 whether the memory transaction is a data read transaction or a data write transaction. If the memory transaction is not a data read transaction or a data write transaction (e.g., if the memory transaction is an instruction fetch transaction), the cache memory device may deny 512 the memory transaction. If the memory transaction is a data read transaction or a data write transaction, the cache memory device may determine 514 whether the DORA bit is enabled (e.g., whether the DORA bit is set to '1'). The cache memory device may allow 506 the memory transaction when the DORA bit is enabled or may deny 512 the memory transaction when the DORA bit is not enabled. In other aspects of the present disclosure, the determination whether to allow or deny a memory transaction described with respect to the example flow diagram 500 of FIG. 5 may be performed by the MMU 406 or other suitable entity or device.

ii) Data Read Operations in Realm Mode

In an aspect of the present disclosure, the data cache memory device 434 may receive a data read transaction and may determine that the data read transaction is allowed. The data cache memory device 434 may then determine whether the RID in such data read transaction indicates a realm (e.g., an RID may be determined as indicating a realm when the RID is not zero or a predetermined special value that indicates no realm) and whether the realm indicator bit in the data read transaction is not enabled (e.g., the realm indicator bit may not be enabled when the realm indicator bit is set to '0'). If the RID in the data read transaction indicates a realm and the realm indicator bit is not enabled, the data cache memory device 434 may define the RID in the data read transaction as zero (or as the predetermined special value) for any subsequent operations. It should be noted that in order for a data read transaction to be allowed when the RID in the data read transaction indicates a realm and the realm indicator bit is not enabled, the DORA bit in the data read transaction needs to be enabled.

The data cache memory device 434 may proceed to determine whether the data requested in the data read transaction is currently stored in the data cache memory device 434. For example, the data cache memory device 434 may check whether the memory location (e.g., memory pages or addresses corresponding to regions in the memory device 410) indicated in the data read transaction has been previously received from the memory device 410 and stored at the data cache memory device 434. If the data requested in the data read transaction is not currently stored in the data cache memory device 434, a cache miss may occur and the data cache memory device 434 may forward the data read transaction to the software protection device 408. The software protection device 408 may receive the data read transaction (e.g., including the RID) and may forward the data read transaction to the memory device 410. The memory device 410 may provide the data requested by the data read transaction to the software protection device 408.

In one aspect, if the data provided by the memory device 410 to the software protection device 408 is from the realm (e.g., the realm 428) associated with the RID in the data read transaction, such data provided to the software protection device 408 is in encrypted form. Therefore, the software protection device 408 may proceed to decrypt the data received from the memory device 410 with the EEK associated with the RID (e.g., the EEK of the RID/EEK pair 430) in the data read transaction. The software protection device 408 may provide the decrypted data to the data cache memory device 434 along with the RID (e.g., the RID of the realm 428) via the data flow 450. In an aspect, the data cache memory device 434 may store the decrypted data with a cache tag that includes the memory location associated with the decrypted data. In an aspect, the cache tag may be configured to include a realm tag (Rtag), such as the realm tag 464, indicating the RID. The data cache memory device 434 may then transmit the decrypted data to the core device 402 via data flows 448, 440.

In another aspect, if the data provided by the memory device 410 to the software protection device 408 is from outside the realm 428 (e.g., when the RID is defined as zero or a special value that indicates no realm, the realm indicator bit is not enabled, and the DORA bit is enabled in a data read transaction), such data provided to the software protection device 408 is not in encrypted form. The software protection device 408 may provide the data to the data cache memory device 434 along with the RID (e.g., where the RID is now defined as zero or a special value that indicates no realm) via the data flow 450. In an aspect, the data cache memory device 434 may store the data with a cache tag that includes the memory location associated with the data. In an aspect, the cache tag may be configured to include a realm tag (Rtag), such as the realm tag 464, indicating the RID. The data cache memory device 434 may then transmit the data to the core device 402 via data flows 448, 440.

If the data cache memory device 434 determines that the data requested in the data read transaction is currently stored in the data cache memory device 434 (e.g., the data cache memory device 434 locates the cache line containing the requested data), the data cache memory device 434 may determine whether the RID in the data read transaction matches the RID associated with the cache line containing the requested data (e.g., the RID in the realm tag 464). If the RID in the data read transaction matches the RID in the cache line containing the requested data, the data cache memory device 434 may transmit the requested data to the core device 402. Otherwise, if the RID in the data read transaction does not match the RID associated with the cache line (e.g., the RID in the realm tag 464) containing the requested data, the data cache memory device 434 may refrain from transmitting the requested data to the core device 402. Furthermore, in one aspect, the core device 402 may consider the data read transaction to be a failed memory transaction and may exit the realm 428.

iii) Instruction Fetch Operations in Realm Mode

In an aspect of the present disclosure, the instruction cache memory device 432 may receive an instruction fetch transaction and may determine that the instruction fetch transaction is allowed. The instruction cache memory device 432 may proceed to determine whether the instruction requested in the instruction fetch transaction is currently stored in the instruction cache memory device 432. For example, the instruction cache memory device 432 may check whether the memory location (e.g., memory pages or addresses corresponding to regions in the memory device 410) indicated in the instruction fetch transaction has been previously received from the memory device 410 and stored the instruction cache memory device 432. If the instruction requested in the instruction fetch transaction is not currently stored in the instruction cache memory device 432, a cache miss may occur and the instruction cache memory device 432 may forward the instruction fetch transaction to the software protection device 408. The software protection device 408 may receive the instruction fetch transaction (e.g., including the RID) and may forward the instruction fetch transaction to the memory device 410. The memory device 410 may provide the instruction requested by the instruction fetch transaction to the software protection device 408.

It should be noted that if the instruction provided by the memory device 410 to the software protection device 408 is from the realm (e.g., the realm 428) associated with the RID in the instruction fetch transaction, such instruction provided to the software protection device 408 is in encrypted form. Therefore, the software protection device 408 may proceed to decrypt the instruction received from the memory device 410 with the EEK associated with the RID in the instruction fetch transaction. The software protection device 408 may provide the decrypted instruction to the instruction cache memory device 432 along with the RID (e.g., the RID of the realm 428) via the instruction flow 444. In an aspect, the instruction cache memory device 432 may store the decrypted instruction with a cache tag that includes the memory location associated with the decrypted instruction. In an aspect, the cache tag may be configured to include a realm tag (e.g., the realm tag 462) that includes the RID. The instruction cache memory device 432 may then transmit the decrypted instruction to the core device 402 via the instruction flows 442, 440.

If the instruction cache memory device 432 determines that the instruction requested in the instruction fetch transaction is currently stored in the instruction cache memory device 432 (e.g., the instruction cache memory device 432 locates the cache line containing the requested instruction), the instruction cache memory device 432 may determine whether the RID in the instruction fetch transaction matches the RID associated with the cache line containing the requested instruction (e.g., the RID in the realm tag 462). If the RID in the data fetch transaction matches the RID associated with the cache line containing the requested instruction, the instruction cache memory device 432 may transmit the requested instruction to the core device 402. Otherwise, if the RID in the instruction fetch transaction does not match the RID associated with the cache line (e.g., the RID in the realm tag 462) containing the requested instruction, the instruction cache memory device 432 may refrain from transmitting the requested data to the core device 402. Furthermore, in one aspect, the core device 402 may consider the instruction fetch transaction to be a failed memory transaction and may exit the realm 428.

iv) Data Write Operations in Realm Mode

In an aspect of the present disclosure, the data cache memory device 434 may receive a data write transaction and may determine that the data write transaction is allowed. The data cache memory device 434 may then determine whether the RID in such data write transaction indicates a realm (e.g., an RID may be determined as indicating a realm when the RID is not zero or a predetermined special value that indicates no realm) and whether the realm indicator bit in the data write transaction is not enabled (e.g., the realm indicator bit is set to '0'). If the RID in the data write transaction indicates a realm and the realm indicator bit is not enabled, the data cache memory device 434 may define the RID in the data write transaction as zero (or as the predetermined special value) for any subsequent operations. It should be noted that in order for a data write transaction to be allowed when the RID in the data write transaction indicates a realm and the realm indicator bit is not enabled, the DORA bit in the data write transaction needs to be enabled.

The data cache memory device 434 may proceed to determine whether the memory location of the memory device 410 where the data is to be written is currently stored in the data cache memory device 434. For example, the data cache memory device 434 may check whether the memory location (e.g., memory pages or addresses corresponding to regions in the memory device 410) indicated in the data write transaction has been previously stored in the data cache memory device 434. If the memory location where the data is to be written is not currently stored in the data cache memory device 434, a cache miss may occur and the data cache memory device 434 may proceed to store the data. In one example, the data cache memory device 434 may store the data to be written to the memory device 410 in a cache line along with information indicating the memory location where the data is to be written and a realm tag (e.g., the realm tag 464) that indicates the RID.

When the cache line of the data cache memory device 434 is flushed, the data cache memory device 434 may transmit the data of the cache line to the software protection device 408 via the data flow 450 along with the memory location where the data is be written and the RID in a realm tag (e.g., the realm tag 464) associated with the cache line. In one aspect, if the RID in a realm tag (e.g., the realm tag 464) indicates a realm (e.g., the RID is not zero or a predetermined special value that indicates no realm), the software protection device 408 may obtain the EEK associated with the RID from the key store 414 and may encrypt (e.g., by implementing the memory encryption module 416) the data with the EEK. The software protection device 408 may then store the encrypted data in the realm 428 (e.g., in the memory location corresponding to the realm 428 as requested by the core device 402) of the memory device 410. In another aspect, if the RID in a realm tag (e.g., the realm tag 464) does not indicate a realm (e.g., the RID is zero or a predetermined special value that indicates no realm), the software protection device 408 may not encrypt the data. In such aspect, the software protection device 408 may then store the data in a memory location of the memory device 410 that is outside of the realm 428.

If the data cache memory device 434 determines that the memory location where the data is to be written is currently stored in the data cache memory device 434 (e.g., the data cache memory device 434 locates the cache line associated with the memory location where the data is to be written), the data cache memory device 434 may determine whether the RID in the data write transaction matches the RID associated with the located cache line (e.g., the RID in the realm tag 464). If the RID in the data write transaction matches the RID associated with the cache line (e.g., the RID in the realm tag 464) in the data cache memory device 434, the data cache memory device 434 may store the data and may further store the RID of the data write transaction in a realm tag. Otherwise, if the RID in the data write transaction does not match the RID associated with the cache line (e.g., the RID in the realm tag 464) in the data cache memory device 434, the data cache memory device 434 may refrain from storing the data to be written to the memory device 410. Furthermore, in one aspect, the core device 402 may consider the data write transaction to be a failed memory transaction and may exit the realm 428. Therefore, according to some aspects, in order to write data to a memory location that is already stored at the data cache memory device 434 and which has an RID in a realm tag (e.g., the realm tag 464) that is different from the RID of the data write transaction, the current cache line in the data cache memory device 434 should be flushed prior to the write operation.

Snooping Cache Lines

In one example scenario, when the core device 402 requests data from a memory location associated with the memory device 410, the data cache memory device 434 (also referred to as a local data cache) of the core device 402 may determine that the memory location has not been stored by the data cache memory device 434. In this scenario, the data cache memory device 434 may snoop the cache lines of other data cache memory devices being served by the software protection device 408 to determine whether such other data cache memory devices have stored the requested memory location. In an aspect, the data cache memory device 434 and such other data cache memory devices may be situated upstream of the software protection device 408, in which case the software protection device 408 is situated after the data cache memory device 434 and the other data cache memory devices, but before the memory device 410. For example, the data cache memory device 434 may propagate the RID associated with the request for data to the other data cache memory devices via a snoop channel (e.g., a shared bus). If the RID propagated by the data cache memory device 434 matches an RID in a cache tag of a cache line stored by one of the other data caches, the data cache memory device 434 may receive and store the data from the data cache memory devices with the matching RID. A similar approach may be applied by the instruction cache memory device 432 when the core device 402 requests an instruction from a memory location associated with the memory device 410.

In another example scenario, when the core device 402 requests data from a memory location associated with the memory device 410, the data cache memory device 434 (also referred to as the local data cache) of the core device 402 may determine that the memory location has not been stored by the data cache memory device 434. In this scenario, the data cache memory device 434 may snoop other data cache memory devices being served by a different software protection device (e.g., a software protection device other than the software protection device 408). In such scenario, the data cache memory device 434 and the other data cache memory devices may be upstream of both the software protection device 408 and the different software protection device. In one example, the RID associated with the request for data may be propagated on an off cluster bus to determine whether the RID associated with the request for data matches with an RID of a cache tag in a cache line stored by the other data cache memory devices being served by the different software protection device. In another example approach, the data cache memory device 434 may refrain from propagating the RID associated with the request for data on the off cluster bus. Instead, the data cache memory device 434 may determine whether the physical address of the memory location associated with the request for data matches a physical address in any cache lines of the other data cache memory devices. If a match is found, the requested data in the matching data cache memory device may be encrypted by the different software protection device using the RID (also referred to as RID') in the cache tag of the matching data cache memory device. Subsequently, the requested data may be decrypted by the software protection device 408 using the RID associated with the request for data. Therefore, unless the RID' is identical (or equivalent) to the RID associated with the request for data from the core device 402, the requested data may not be decrypted properly and may not provide any usable data.

Dumping Cache Lines

In one aspect of the present disclosure, data stored in the data cache memory device 434 and/or instructions stored in the instruction cache memory device 432 may be in the clear (e.g., unencrypted). In such aspect, an attacker (e.g., adversaries 468) may attempt to obtain the cached data from the data cache memory device 434 by transmitting a first cache dump command 476 and/or may attempt to obtain the cached instructions from the instruction cache memory device 432 by transmitting a second cache dump command 472. An attacker may further attempt to modify the realm indicator bit 424 via command 474 and/or attempt to modify the realm indicator bit 426 via command 470. For example, an attacker may use a debugging chip or other hardware and/or software to transmit the first cache dump command 476 and/or the second cache dump command 472. In order to prevent such unauthorized use of a cache dump command, the filter device 466 may detect the first cache dump command 476 and/or the second cache dump command 472, and may determine whether an RID in the realm tags 462, 464 is zero or a predetermined special value that indicates no realm. In an aspect, if an RID in the realm tags 462, 464 is zero or the predetermined special value, filter device 466 may transmit the instructions stored in the instruction cache memory device 432 and/or may transmit the data stored in the data cache memory device 434. Otherwise, if an RID in the realm tags 462, 464 is zero or the predetermined special value, the filter device 466 may refrain from transmitting the instructions or data in response to the cache dump command. Therefore, the filter device 466 may prevent the contents of the instruction cache memory device 432 and/or the data cache memory device 434 from being transmitted (e.g., to the adversaries 468) in response to a cache dump command. In an aspect, the filter device 466 may be implemented in the instruction cache memory device 432 and/or the data cache memory device 434.

Reading/Writing Protected Realm Data from Non Realm Mode

In an aspect of the present disclosure, the core device 402 may flush caches (or the relevant cache lines) of a cache memory device (e.g., the instruction cache memory device 432 and/or the data cache memory device 434), and may erase a realm indicator bit (e.g., RB 424 and/or RB 426) in a page descriptor of a memory page associated with a memory device (e.g., the memory device 410). The core device 402 may then initiate a read or write transaction. For example, the read or write transaction may be on encrypted data. The core device 402 may then flush the caches again (or the relevant cache lines). The core device 402 may restore the realm indicator bit in the page descriptor of the memory page. It should be noted that if the memory page is swapped out, it may be swapped out with the original physical address associated with the memory device 410. When the memory page is read back into the cache memory device, and if reloaded at a different physical address associated with the memory device 410, the memory page may be decrypted and re-encrypted for the new physical address. In an aspect, such a swapping operation may be managed by the realm manager 412. For example, the realm manager 412 may implement the memory encryption module 416 to perform the encryption and/or decryption.

Execution of a Realm in a Second Example Architecture

Figure 6:
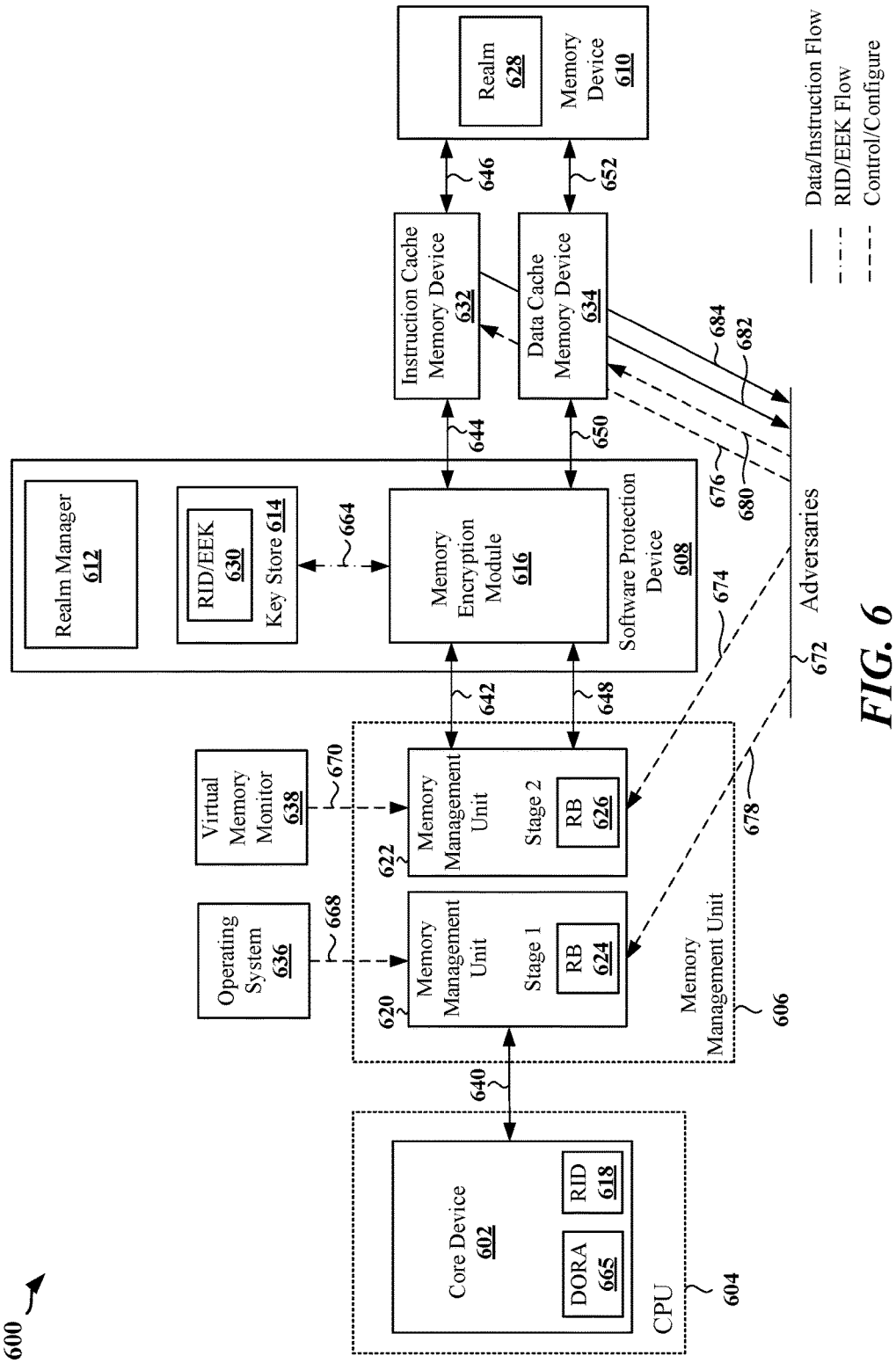
FIG. 6 is a block diagram of an example architecture in accordance with various aspects of the present disclosure.

FIG. 6 is a block diagram of an example architecture 600 in accordance with various aspects of the present disclosure. For example, the architecture 600 may be implemented in a computing device, such as a personal computer, cell phone (also referred to as a UE), or a handheld gaming device. As shown in FIG. 6, the architecture 600 includes a core device 602, a memory management unit (MMU) 606, a software protection device 608, and a memory device 610. For example, the core device 602 may be a processor in a central processing unit (CPU) 604. In an aspect, the software protection device 608 may include a realm manager 612, a key store 614, and a memory encryption module 616. In other aspects, the MMU 606 may be included in the CPU 604. In an aspect of the present disclosure, the software protection device 608, the memory device 610, the realm manager 612, the key store 614, and the memory encryption module 616 in FIG. 6 may respectively correspond to the software protection device 302, the memory device 304, the realm manager 308, the key store 310, and the memory encryption module 312 in FIG. 3.

Core Device Operations for Realm Execution

In one aspect of the present disclosure, the core device 602 may initiate a memory transaction with respect to the memory device 610 by transmitting a memory command to the MMU 606. Therefore, in one example, the memory command may be configured to execute a data read transaction for reading data from the memory device 610 or may be configured to execute a data write transaction for writing data to the memory device 610. In another example, the memory command may be configured to execute an instruction fetch transaction (also referred to as an instruction read transaction) for fetching an instruction from the memory device 610.

In one aspect of the present disclosure, after the realm 628 has been established and the encrypted instructions and/or data of the target software 318 have been stored in the realm 628 in a manner previously described, the core device 602 may enter the realm 628 to read data from the realm 628, write data to the realm 628, or fetch an instruction from the realm 628. In an aspect of the present disclosure, the core device 602 may include an RID register 618 that is configured to store an RID. The RID register 618 may not be visible to any software. In one example, the RID register 618 may indicate that no realm is being referenced or identified when a zero value or other special value is stored in the RID register 618. For example, when the core device 602 executes an instruction for entering the realm 628, the core device 602 may set the RID value corresponding to the realm 628 in the RID register 618 and may jump to the beginning of the realm 628. In one aspect of the present disclosure, each memory transaction between the core device 602 and the memory device 610 may be tagged to include the RID currently stored in the RID register 618, the type of memory transaction (e.g., data or instruction), and an optional control bit (also referred to as a DORA bit 665). For example, similar to memory transactions of the core device 402 previously described with respect to FIG. 4, the core device 602 may include the RID in the RID register 618, the type of memory transaction (e.g., data or instructions), and the optional DORA bit 665 in a memory command (e.g., for initiating a data read/write transaction or an instruction fetch transaction) and may transmit the memory command to the MMU 606.

Memory Management Unit (MMU) Operations for Realm Execution

In some aspects of the present disclosure, the MMU 606 may be configured for multiple stages of address translation. For example, as shown in FIG. 6, the MMU 606 may include a first address translation stage (also referred to as MMU stage 1 620) and a second address translation stage (also referred to as MMU stage 2 622). In one example, the MMU stage 1 620 may be configured to translate virtual memory addresses to intermediate physical memory addresses. Accordingly, the MMU stage 1 620 may maintain a memory page table (e.g., mapping between virtual addresses and intermediate addresses) and may include a realm indicator bit (RB) 624 in memory pages belonging to a realm. The MMU stage 2 622 may be configured to translate intermediate physical memory addresses to physical memory addresses of the memory device 610. Accordingly, the MMU stage 2 622 may maintain a memory page table (e.g., mapping between intermediate addresses and physical addresses) and may include a realm indicator bit (RB) 626 in memory pages belonging to a realm. In one aspect of the present disclosure, the operating system (OS) 636 may control 668 the mapping of virtual memory addresses to intermediate physical memory addresses, and the virtual memory monitor (VMM) 638 may control 670 the mapping of intermediate physical addresses to physical memory addresses.

In an aspect of the present disclosure, the MMU 606 may receive a memory transaction (e.g., a memory command for initiating a data read/write transaction or an instruction fetch transaction) from the core device 602. The memory transaction may include a memory transaction address (e.g., a memory address from which data or an instruction is to be read, or to which data is to be written) that is associated with the memory device 610. The MMU 606 may determine a memory page corresponding to the memory transaction address and may determine the value (e.g., '0' or '1') of the realm indicator bit (e.g., RB 624 or RB 626) for the memory page. The MMU 606 may include the value of the realm indicator bit in the memory transaction received from the core device 602 and may forward the memory transaction including the RID 618 (e.g., the value currently stored in the RID register 618), the optional DORA bit 665, and the value of the realm indicator bit to the software protection device 608. In one example, the MMU 606 may determine that the memory transaction is an instruction fetch transaction and may forward such memory transaction (including the RID 618, the optional DORA bit 665, and the value of the realm indicator bit) to the software protection device 608 via the instruction flow 642. In another example, the MMU 606 may determine that the memory transaction is a data transaction (e.g., data read or data write transaction) and may forward the memory transaction (including the RID 618, the optional DORA bit 665, and the value of the realm indicator bit) to the software protection device 608 via the data flow 648. In one aspect, the MMU 606 may not translate and/or modify the RID 618 and the optional DORA bit 665 in a memory transaction. In an aspect of the present disclosure, the MMU 606 may determine whether to allow or deny the memory transaction based on the previously described example flow diagram 500 of FIG. 5.

Cache Memory Device Operations for Realm Execution

In the aspect of FIG. 6, the software protection device 608 is coupled to an instruction cache memory device (I-Cache) 632 and a data cache memory device (D-Cache) 634. For example, the core device 602 may fetch instructions from the instruction cache memory device 632 via instruction flows 640, 642, and 644, and may read data from (or data write to) the data cache memory device 634 via data flows 640, 648, and 650. As shown in FIG. 6, the instruction cache memory device 632 and data cache memory device 634 are further coupled to the memory device 610. In one aspect of the present disclosure, the instruction cache memory device 632 and the data cache memory device 634 may be referred to as a level 1 (L1) cache. In such aspect, the software protection device 608 in FIG. 6 may be said to be situated before the L1 cache. It should be understood that the aspects described herein with respect to an instruction cache memory device (e.g., the instruction cache memory device 632) and a data cache memory device (e.g., the data cache memory device 634) may be applied to a single cache memory device (also referred to as a unified cache memory device) configured to store both data and instructions.

In one aspect of the present disclosure, the instruction cache memory device 632 may store instructions fetched from the memory device 610 and the corresponding memory locations (e.g., memory pages corresponding to regions in the memory device 610) of the fetched instructions. For example, the instructions stored in the instruction cache memory device 632 may be instructions previously requested by the core device 602 as a result of a prior instruction fetch memory transaction. In another aspect of the present disclosure, the data cache memory device 634 may store data read from the memory device 610 and the corresponding memory locations (e.g., memory pages corresponding to regions in the memory device 610) of the read data. For example, the data stored in the data cache memory device 634 may be data previously requested by the core device 602 as a result of a prior data read memory transaction. The data cache memory device 634 may further store data to be written to the memory device 610 and the corresponding memory locations (e.g., memory pages corresponding to regions in the memory device 610) where the data is to be written. For example, the data stored in the data cache memory device 634 may be data previously transmitted by the core device 602 as a result of a prior data write memory transaction.

In one example, the core device 602 may request instructions or data from the realm 628 of the memory device 610. In other words, the core device 602 may request to fetch instructions or read data from the region in the memory device 610 associated with the RID in the RID register 618. The MMU 606 may determine that the request is allowed and may forward the request to the software protection device 608. The software protection device 608 may receive the request for instructions or data along with the RID 618. For example, if the request is for instructions, the software protection device 608 may forward the request to the instruction cache memory device 632 via the instruction flow 644, and the instruction cache memory device 632 may proceed to forward the request to the memory device 610 via the instruction flow 646. Thereafter, the memory device 610 may provide the requested instructions to the instruction cache memory device 632 via instruction flow 646. For example, if the request is for data, the software protection device 608 may forward the request to the data cache memory device 634 via the data flow 650, and the data cache memory device 634 may proceed to forward the request to the memory device 610 via the data flow 652. Thereafter, the memory device 610 may provide the requested data to the data cache memory device 634 via the data flow 652.

It should be noted that the instructions or data read from the realm 628 of the memory device 610 may be in encrypted form. For example, the instructions or data in the realm 628 may be previously encrypted using an EEK (e.g., the EEK of the RID/EEK pair 630 in the key store 614) corresponding to the RID of the realm 628. Therefore, if the request is for instructions, the instruction cache memory device 632 may store the encrypted instructions from the memory device 610. If the request is for data, the data cache memory device 634 may store the encrypted data from the memory device 610. When the software protection device 608 receives the requested instructions from the instruction cache memory device 632 or the requested data from the data cache memory device 634, the software protection device 608 may decrypt the requested instructions or data using the EEK corresponding to the RID of the realm 628. In one example, the software protection device 608 may provide decrypted instructions to the core device 602 via instruction flows 642, 640 or may provide decrypted data to the core device 602 via data flows 648, 640.

In the configuration of FIG. 6, since the software protection device 608 is situated immediately after the MMU 606, latencies may be imposed due to encryption/decryption operations that are performed by the software protection device 608 (e.g., the encryption/decryption operations performed by the memory encryption module 616) when reading/writing to the cache memory devices (e.g., the instruction cache memory device 632 and the data cache memory device 634). Such latencies may not be suitable for some applications.

In some scenarios, an attacker (e.g., adversaries 672) may attempt to obtain stored data from the data cache memory device 634 or stored instructions from the instruction cache memory device 632 by implementing a cache dump command. For example, an attacker may transmit a first cache dump command 680 to the data cache memory device 634 and/or a second cache dump command 676 to the instruction cache memory device 632. An attacker may further attempt to modify the RB 624 via the command 678 and/or attempt to modify the RB 626 via the command 674. For example, an attacker may use a debugging chip or other hardware and/or software to transmit the first cache dump command 680 and/or the second cache dump command 676. However, since the stored data in the data cache memory device 634 or stored instructions in the instruction cache memory device 632 are in encrypted form, the data cache memory device 634 and the instruction cache memory device 632 may transmit encrypted outputs 682, 684 that do not include any usable (e.g., understandable) information.

Exemplary Apparatus and Method Thereon

Figure 7:
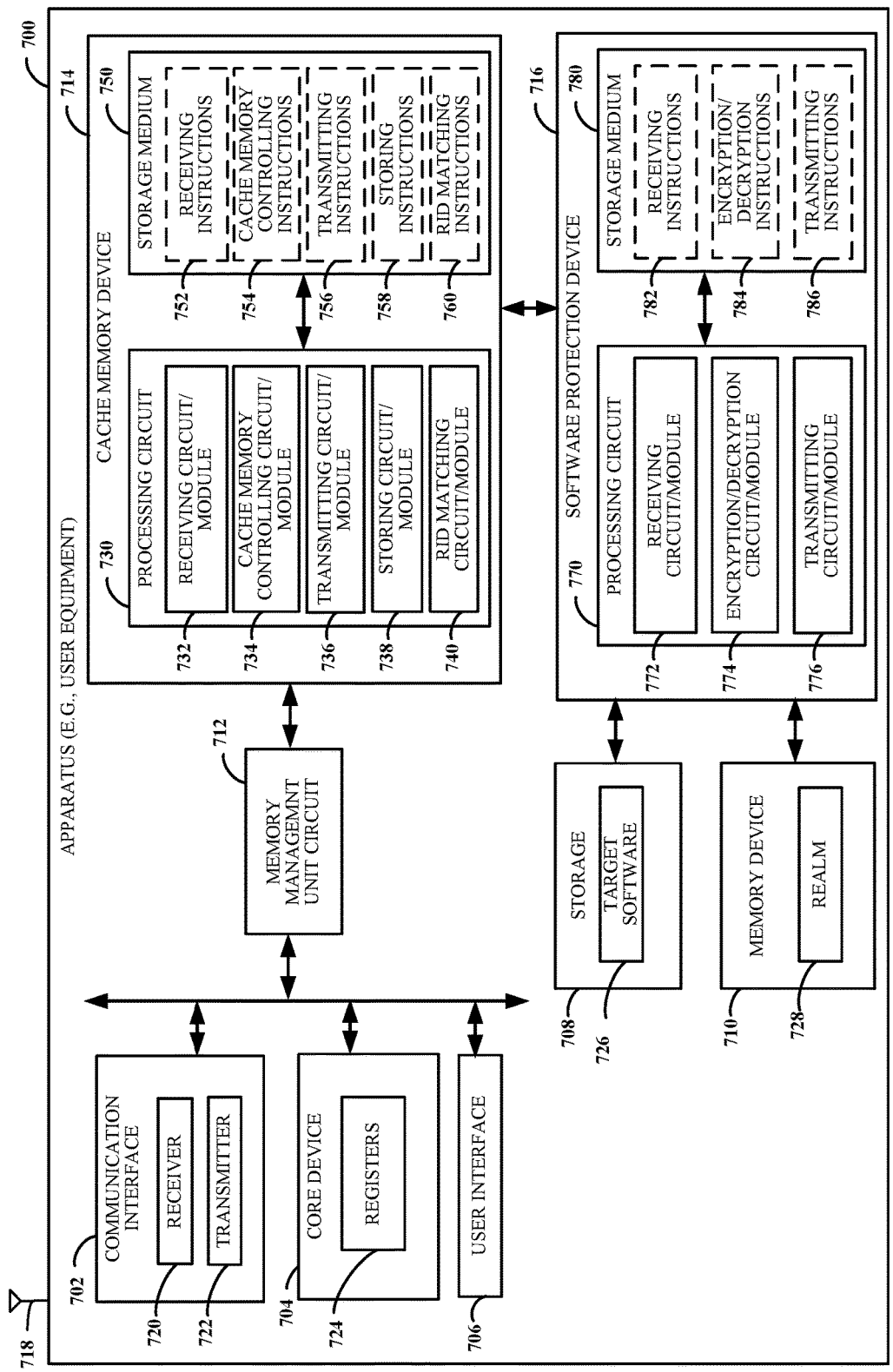
FIG. 7 is an illustration of an apparatus configured to support operations related to memory transactions at a cache memory device in accordance with various aspects of the present disclosure.

FIG. 7 is an illustration of an apparatus 700 configured to support operations related to protecting software in a memory device according to one or more aspects of the disclosure (e.g., aspects related to the methods of FIGS. 8-13 described below). The apparatus 700 includes a communication interface (e.g., at least one transceiver) 702, a core device 704, a user interface 706, a storage 708, a memory device 710, an MMU circuit 712, a cache memory device 714, and a software protection device 716.

These components can be coupled to and/or placed in electrical communication with one another via a signaling bus or other suitable component, represented generally by the connection lines in FIG. 7. The signaling bus may include any number of interconnecting buses and bridges depending on the specific application of the core device 704 and the overall design constraints. The signaling bus links together the communication interface 702, the core device 704, the user interface 706, and the MMU circuit 712. The signaling bus may also link various other circuits (not shown) such as timing sources, peripherals, voltage regulators, and power management circuits, which are well known in the art, and therefore, will not be described any further.

The communication interface 702 may be adapted to facilitate wireless communication of the apparatus 700. For example, the communication interface 702 may include circuitry and/or code (e.g., instructions) adapted to facilitate the communication of information bi-directionally with respect to one or more communication devices in a network. The communication interface 702 may be coupled to one or more antennas 718 for wireless communication within a wireless communication system. The communication interface 702 can be configured with one or more standalone receivers and/or transmitters, as well as one or more transceivers. In the illustrated example, the communication interface 702 includes a receiver 720 and a transmitter 722.

The core device 704 may include one or more registers 724, such as the RID register 418 or a register for setting an optional control bit (e.g., the DORA bit 456), that is not write accessible to external entities. For example, the core device 704 may correspond to the core device 402 in FIG. 4 or the core device 602 in FIG. 6.

The memory device 710 may represent one or more memory devices. For example, the memory device 710 may correspond to the memory device 304 in FIG. 3 or the memory device 410 in FIG. 4. The memory device 710 may serve as a main memory for the core device 704 of the apparatus 700. In some implementations, the memory device 710, the storage 708, and the storage mediums 750, 780 are implemented as a common memory component. The memory device 710 may also be used for storing data that is manipulated by the core device 704 or some other component of the apparatus 700.

The storage mediums 750, 780 may represent one or more computer-readable, machine-readable, and/or processor-readable devices for storing code, such as processor executable code or instructions (e.g., software, firmware), electronic data, databases, or other digital information. For example, the storage medium 750 may be used for storing data that is manipulated by the processing circuit 730 of the cache memory device when executing code. For example, the storage medium 780 may be used for storing data that is manipulated by the processing circuit 770 of the software protection device 716 when executing code. The storage mediums 750, 780 may be any available media that can be accessed by a general purpose or special purpose processor, including portable or fixed storage devices, optical storage devices, and various other mediums capable of storing, containing or carrying code.

By way of example and not limitation, the storage medium 750 and/or the storage medium 780 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 750 and/or the storage medium 780 may be embodied in an article of manufacture (e.g., a computer program product). By way of example, a computer program product may include a computer-readable medium in packaging materials. In view of the above, in some implementations, the storage mediums 750, 780 may each be a non-transitory (e.g., tangible) storage medium. The storage medium 750 may be coupled to the processing circuit 730 of the cache memory device 714, such that the processing circuit 730 can read information from, and write information to, the storage medium 750. The storage medium 780 may be coupled to the processing circuit 770 of the software protection device 716, such that the processing circuit 770 can read information from, and write information to, the storage medium 780.

Code and/or instructions stored by the storage medium 750, when executed by the processing circuit 730 of the cache memory device 714, causes the processing circuit 730 to perform one or more of the various functions and/or process operations described herein. For example, the storage medium 750 may include operations configured for regulating operations at one or more hardware blocks of the processing circuit 730. Code and/or instructions stored by the storage medium 780, when executed by the processing circuit 770 of the software protection device 716, causes the processing circuit 770 to perform one or more of the various functions and/or process operations described herein. For example, the storage medium 780 may include operations configured for regulating operations at one or more hardware blocks of the processing circuit 770.

The processing circuit 730 of the cache memory device 714 is generally adapted for processing, including the execution of such code/instructions stored on the storage medium 750. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 730 of the cache memory device 714 is arranged to obtain, process and/or send data, control data access and storage, issue commands, and control other desired operations. The processing circuit 730 may include circuitry configured to implement desired code provided by appropriate media in at least one example. For example, the processing circuit 730 may be implemented as one or more processors, one or more controllers, and/or other structure configured to execute executable code. Examples of the processing circuit 730 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 730 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 730 are for illustration and other suitable configurations within the scope of the disclosure are also contemplated.

According to one or more aspects of the disclosure, the processing circuit 730 may be adapted to perform any or all of the features, processes, functions, operations and/or routines for any or all of the apparatuses described herein. As used herein, the term "adapted" in relation to the processing circuit 730 may refer to the processing circuit 730 being one or more of configured, employed, implemented, and/or programmed to perform a particular process, function, operation and/or routine according to various features described herein.

According to at least one example of the apparatus 700, the processing circuit 730 may include one or more of a receiving circuit/module 732, a cache memory controlling circuit/module 734, a transmitting circuit/module 736, a storing circuit/module 738, and an RID matching circuit/module 740 that are adapted to perform any or all of the features, processes, functions, operations and/or routines described herein (e.g., features, processes, functions, operations and/or routines described with respect to FIGS. 8-11).

The receiving circuit/module 732 may include circuitry and/or instructions (e.g., receiving instructions 752 stored on the storage medium 750) adapted to perform several functions relating to, for example, receiving a request to read an instruction or data associated with a memory device, the request including at least a first realm identifier and a realm indicator bit, receiving an instruction or data from at least one remote cache memory device, receiving a cache dump command, receiving an instruction or data from at least one remote cache memory device, where the received instruction or data is encrypted at a software protection device associated with the at least one remote cache memory device based on the ephemeral encryption key and is subsequently decrypted at a software protection device associated with the cache memory device based on the ephemeral encryption key prior to reception, and receiving a request to write data to a memory page associated with a region of a memory device, the request including at least a first realm identifier and a realm indicator bit.

The cache memory controlling circuit/module 734 may include circuitry and/or instructions (e.g., cache memory controlling instructions 754 stored on the storage medium 750) adapted to perform several functions relating to, for example, determining whether to allow or deny a request to read an instruction or data based on at least the first realm identifier, the realm indicator bit, or the control bit, determining whether to allow or deny the request to write the data based on at least the first realm identifier, the realm indicator bit, or the control bit, defining a first realm identifier as zero when a request is to read the data, the first realm identifier indicates the realm, the realm indicator bit is not enabled, and the control bit is enabled, determining whether a second realm identifier in the cache tag is zero or a special value that indicates no realm when an instruction or data is stored in the cache memory device, determining whether a memory page is stored at the cache memory device, obtaining the instruction or data from the memory device when the instruction or data is not stored in the cache memory device, defining the first realm identifier as zero or a special value that indicates no realm when a request is to write data and the first realm identifier indicates the realm in the memory device, the realm indicator bit is not enabled, and the control bit is enabled The transmitting circuit/module 736 may include circuitry and/or instructions (e.g., transmitting instructions 756 stored on the storage medium 750) adapted to perform several functions relating to, for example, transmitting an instruction or data when the first realm identifier matches the second realm identifier, refraining from transmitting an instruction when a first realm identifier does not match the second realm identifier, refraining from transmitting an instruction or data when a request is denied, refraining from transmitting the instruction or data in response to a cache dump command when a second realm identifier in the cache tag is different from zero or a special value that indicates no realm, transmitting zero values in response to the cache dump command when a second realm identifier in the cache tag is different from zero or the special value that indicates no realm, transmitting the request and the first realm identifier to at least one remote cache memory in a same cluster of caches when the instruction or data is not stored in the cache memory device, transmitting a request to at least one remote cache memory device in a different cluster of caches when the instruction or data is not stored in the cache memory device.

The storing circuit/module 738 may include circuitry and/or instructions (e.g., storing instructions 758 stored on the storage medium 750) adapted to perform several functions relating to, for example, storing the received instruction or data at the cache memory device with a second cache tag including the first realm identifier, storing the data in the memory page at the cache memory device with a cache tag that includes the first realm identifier when the first realm identifier matches the second realm identifier, storing the data in the memory page at the cache memory device with a cache tag that includes the first realm identifier when the memory page is not stored at the cache memory device, refraining from storing the data in the memory page at the cache memory device when the request is denied, and refraining from storing the data in the memory page at the cache memory device when the first realm identifier does not match the second realm identifier.

The RID matching circuit/module 740 may include circuitry and/or instructions (e.g., RID matching instructions 760 stored on the storage medium 750) adapted to perform several functions relating to, for example, determining whether the first realm identifier matches a second realm identifier in a cache tag when the instruction or data is stored in the cache memory device, and/or determining whether a second realm identifier in a cache tag associated with the memory page matches the first realm identifier when the memory page is stored at the cache memory device.

As mentioned above, instructions stored by the storage medium 750, when executed by the processing circuit 730 of the cache memory device 714, causes the processing circuit 730 to perform one or more of the various functions and/or process operations described herein. For example, the storage medium 750 may include one or more of the receiving instructions 752, cache memory controlling instructions 754, transmitting instructions 756, storing instructions 758, and RID matching instructions 760.

The processing circuit 770 of the software protection device 716 is generally adapted for processing, including the execution of such code/instructions stored on the storage medium 780. The processing circuit 770 of the software protection device 716 is arranged to obtain, process and/or send data, control data access and storage, issue commands, and control other desired operations. The processing circuit 770 may include circuitry configured to implement desired code provided by appropriate media in at least one example. For example, the processing circuit 770 may be implemented as one or more processors, one or more controllers, and/or other structure configured to execute executable code. Examples of the processing circuit 770 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 770 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 770 are for illustration and other suitable configurations within the scope of the disclosure are also contemplated.

According to one or more aspects of the disclosure, the processing circuit 770 may be adapted to perform any or all of the features, processes, functions, operations and/or routines for any or all of the apparatuses described herein. As used herein, the term "adapted" in relation to the processing circuit 770 may refer to the processing circuit 770 being one or more of configured, employed, implemented, and/or programmed to perform a particular process, function, operation and/or routine according to various features described herein.

Figure 12:
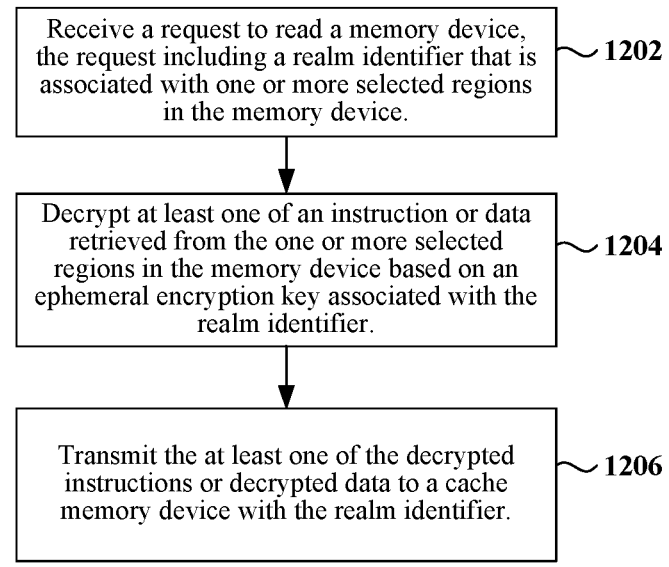
FIG. 12 illustrates a method operational in an apparatus for a memory transaction at a software protection device in accordance with various aspects of the present disclosure.
Figure 13:
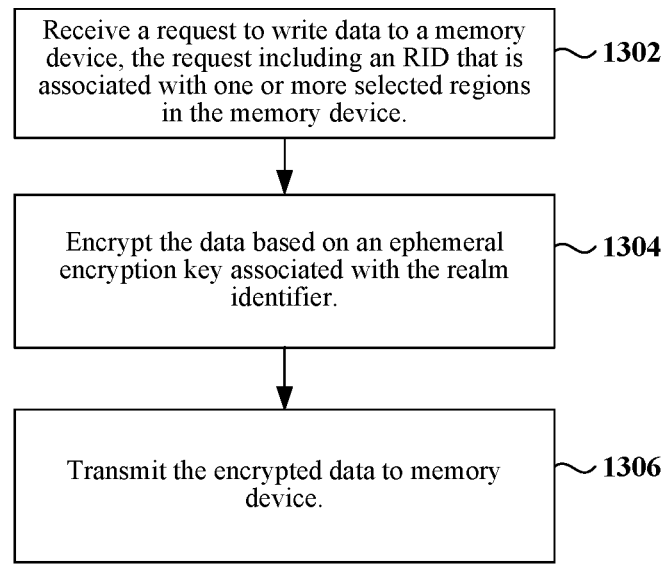
FIG. 13 illustrates a method operational in an apparatus for a memory transaction at a software protection device in accordance with various aspects of the present disclosure.

According to at least one example of the apparatus 700, the processing circuit 770 may include one or more of a receiving circuit/module 772, an encryption/decryption circuit/module 774, and a transmitting circuit/module 776 that are adapted to perform any or all of the features, processes, functions, operations and/or routines described herein (e.g., features, processes, functions, operations and/or routines described with respect to FIGS. 12 and 13).

The receiving circuit/module 772 may include circuitry and/or instructions (e.g., receiving instructions 782 stored on the storage medium 780) adapted to perform several functions relating to, for example, receiving a request to read a memory device, the request including a realm identifier that is associated with one or more selected regions in the memory device and/or receiving a request to write data to a memory device, the request including an RID that is associated with one or more selected regions in the memory device.

The encryption/decryption circuit/module 774 may include circuitry and/or instructions (e.g., encryption/decryption instructions 784 stored on the storage medium 780) adapted to perform several functions relating to, for example, decrypting at least one of an instruction or data retrieved from the one or more selected regions in the memory device based on an ephemeral encryption key associated with the realm identifier, and/or encrypting data based on an ephemeral encryption key associated with the realm identifier.

The transmitting circuit/module 776 may include circuitry and/or instructions (e.g., transmitting instructions 786 stored on the storage medium 780) adapted to perform several functions relating to, for example, transmitting the at least one of the decrypted instructions or decrypted data to a cache memory device with the realm identifier, and/or transmitting encrypted data to a memory device.

First Example Method

Figure 8:
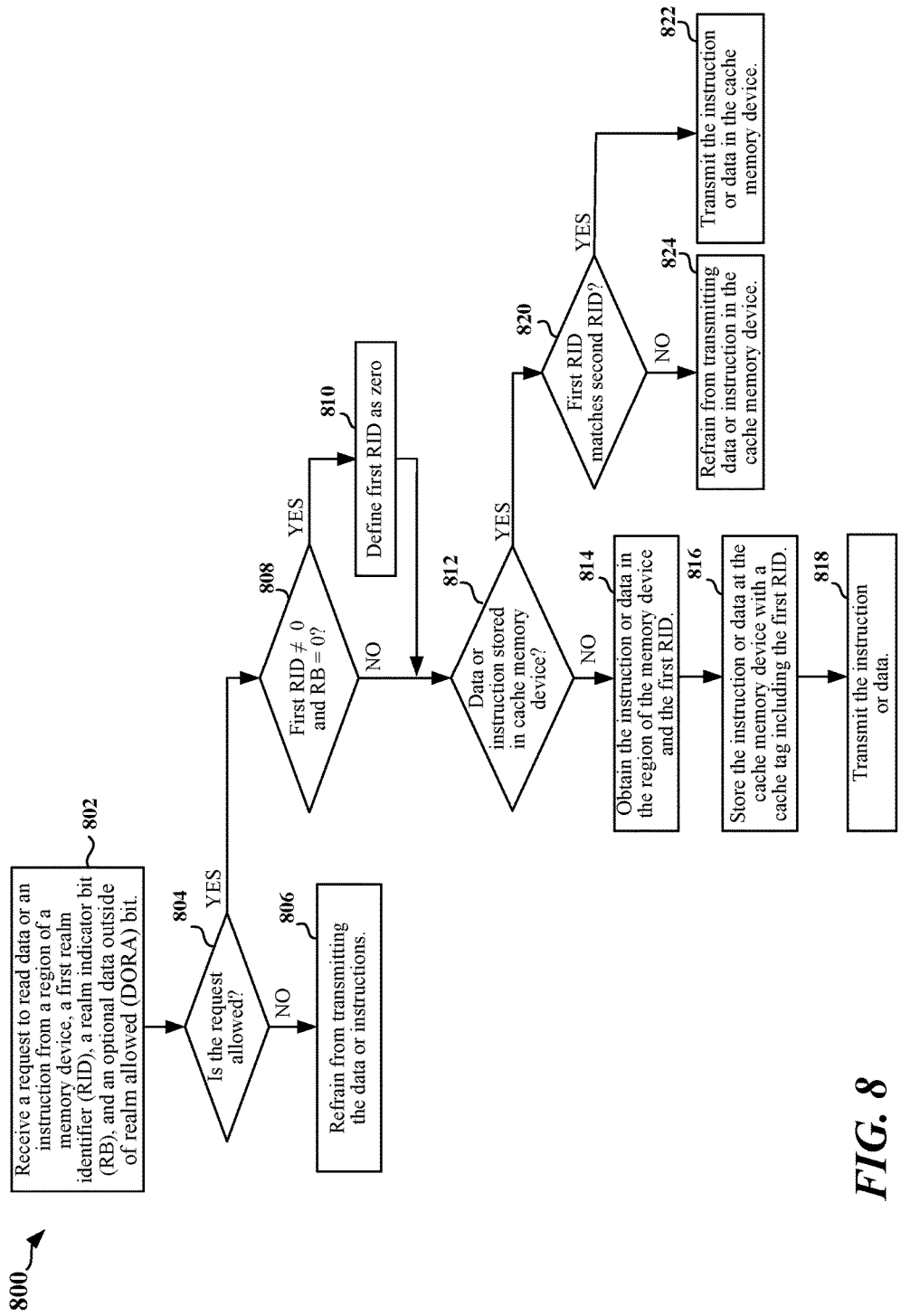
FIG. 8 illustrates a method operational in an apparatus for a memory transaction at a cache memory device in accordance with various aspects of the present disclosure.

FIG. 8 illustrates a method 800 operational in an apparatus for a memory transaction at a cache memory device in accordance with various aspects of the present disclosure. In an aspect, the cache memory device receives a request (also referred to as a memory transaction) to read an instruction or data associated with a memory device 802. The request may include a first realm identifier (RID) that enables identification of a realm that includes one or more selected regions in the memory device. The request may further include a realm indicator bit (RB), and/or an optional DORA bit. The cache memory device determines whether to allow or deny the request based on at least the first realm identifier, the realm indicator bit, or the DORA bit 804. In an aspect, the cache memory device may implement the operations of the example flow diagram 500 of FIG. 5 to determine whether to allow or deny the request. If the request is denied, the cache memory device refrains from transmitting the data or instructions 806. If the request is allowed, the cache memory device determines whether the first RID is zero (or a predetermined special value that indicates no realm) and whether the realm indicator bit is not enabled 808. If the first RID is not zero (or the predetermined special value that indicates no realm) and the realm indicator bit is not enabled (e.g., RB='0'), the cache memory device defines the first RID as zero (or the predetermined special value that indicates no realm) for subsequent operations 810. For example, and with reference to FIG. 5, it should be noted that for a memory transaction to be allowed when the first RID is not zero (or a predetermined special value that indicates no realm) and the realm indicator bit is not enabled (e.g., RB='0') for a memory transaction, such memory transaction is a request to read or write data (not instructions) with the DORA bit being enabled.

The cache memory device determines whether the data or instruction is stored in the cache memory device 812. If the data or instruction is not stored in the cache memory device, the cache memory device obtains the instruction or data from the region of the memory device 814. The cache memory device stores the obtained instruction or data at the cache memory device with a second cache tag including the first RID 816. The cache memory device then transmits the instruction or data 818. If the instruction or data is stored in the cache memory device (e.g., a cache hit occurs), the cache memory device determines whether the first RID matches a second RID in a cache tag 820. In one example scenario, the instruction or data stored in the cache memory device has been decrypted (e.g., at a software protection device) based on an ephemeral encryption key associated with the first RID when the first RID indicates the realm and when the realm indicator bit is enabled (e.g., RB='1'). The cache memory device transmits the instruction or data when the first RID matches the second RID 822. Otherwise, the cache memory device refrains from transmitting the instruction or data when the first realm identifier does not match the second realm identifier 824.

Second Example Method

Figure 9:
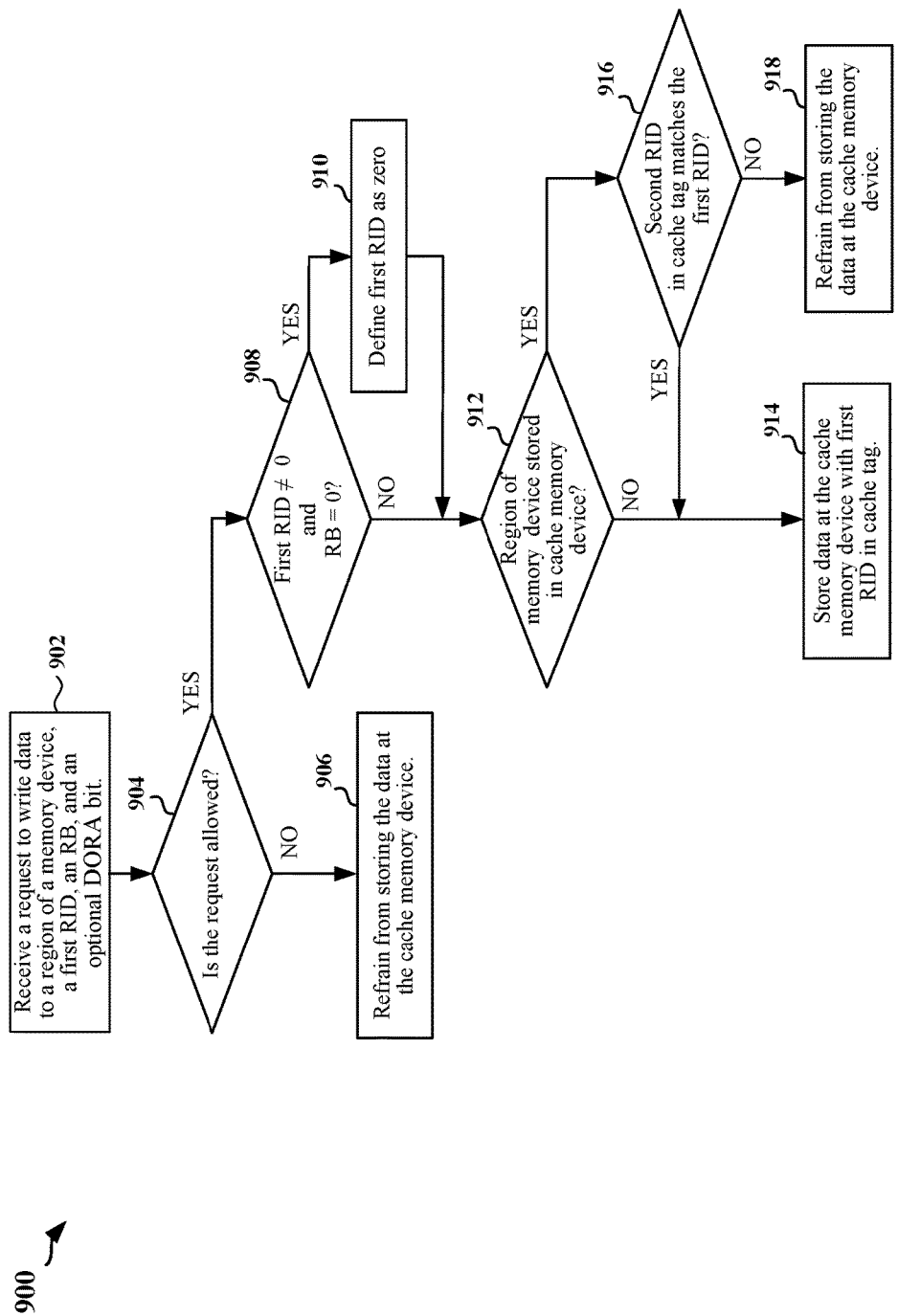
FIG. 9 illustrates a method operational in an apparatus for a memory transaction at a cache memory device in accordance with various aspects of the present disclosure.

FIG. 9 illustrates a method 900 operational in an apparatus for a memory transaction at a cache memory device in accordance with various aspects of the present disclosure. In an aspect, the method 900 may be operational in a write-allocate type of cache memory device or a write-back type of cache memory device. However, it can be appreciated that the method 900 may be effectively implemented in any other suitable type of cache memory device. The cache memory device receives a request to write data to a memory page associated with a region of a memory device 902. The request may include the data to be written, a first RID, a realm indicator bit, and an optional DORA bit. For example, the first realm identifier enables identification of a realm that includes one or more selected regions in the memory device. The cache memory device determines whether to allow or deny the request to write the data based on the first RID, the realm indicator bit, and/or the DORA bit 904. In an aspect, the cache memory device may implement the operations of the example flow diagram 500 of FIG. 5 to determine whether to allow or deny the request. If the request is denied, the cache memory device refrains from storing the data in the memory page at the cache memory device 906. If the request is allowed, the cache memory device determines whether the first RID is zero (or a predetermined special value that indicates no realm) and whether the realm indicator bit is not enabled 908. If the first RID is not zero (or the predetermined special value that indicates no realm) and the realm indicator bit is not enabled (e.g., RB='0'), the cache memory device defines the first RID as zero (or the predetermined special value that indicates no realm) for subsequent operations 910. For example, and with reference to FIG. 5, it should be noted that for a memory transaction to be allowed when the first RID is not zero (or a predetermined special value that indicates no realm) and the realm indicator bit is not enabled (e.g., RB='0') for a memory transaction, such memory transaction is a request to read or write data with the DORA bit being enabled.

The cache memory device determines whether the memory page is stored at the cache memory device 912. If the memory page is not stored in the cache memory device, the cache memory device stores the data in the memory page at the cache memory device with a cache tag that includes the first RID 914. In an aspect, if the first RID is not zero (or a predetermined special value that indicates no realm) and the realm indicator bit is set for the memory page, the data is encrypted with an EEK associated with the first RID after the cache memory device is flushed. If the memory page is stored in the cache memory device, the cache memory device determines whether a second RID in a cache tag associated with the memory page matches the first RID 916. The cache memory device refrains from storing the data in the memory page at the cache memory device when the first RID does not match the second RID 918. Otherwise, when the first RID matches the second RID, the cache memory device stores the data in the memory page at the cache memory device with a cache tag that includes the first realm identifier 914. In an aspect, the data stored in the memory page at the cache memory device when the first realm identifier matches the second realm identifier is encrypted (e.g., at a software protection device) using an ephemeral encryption key associated with the first realm identifier prior to storage in the region of the memory device corresponding to the memory page.

Third Example Method

Figure 10:
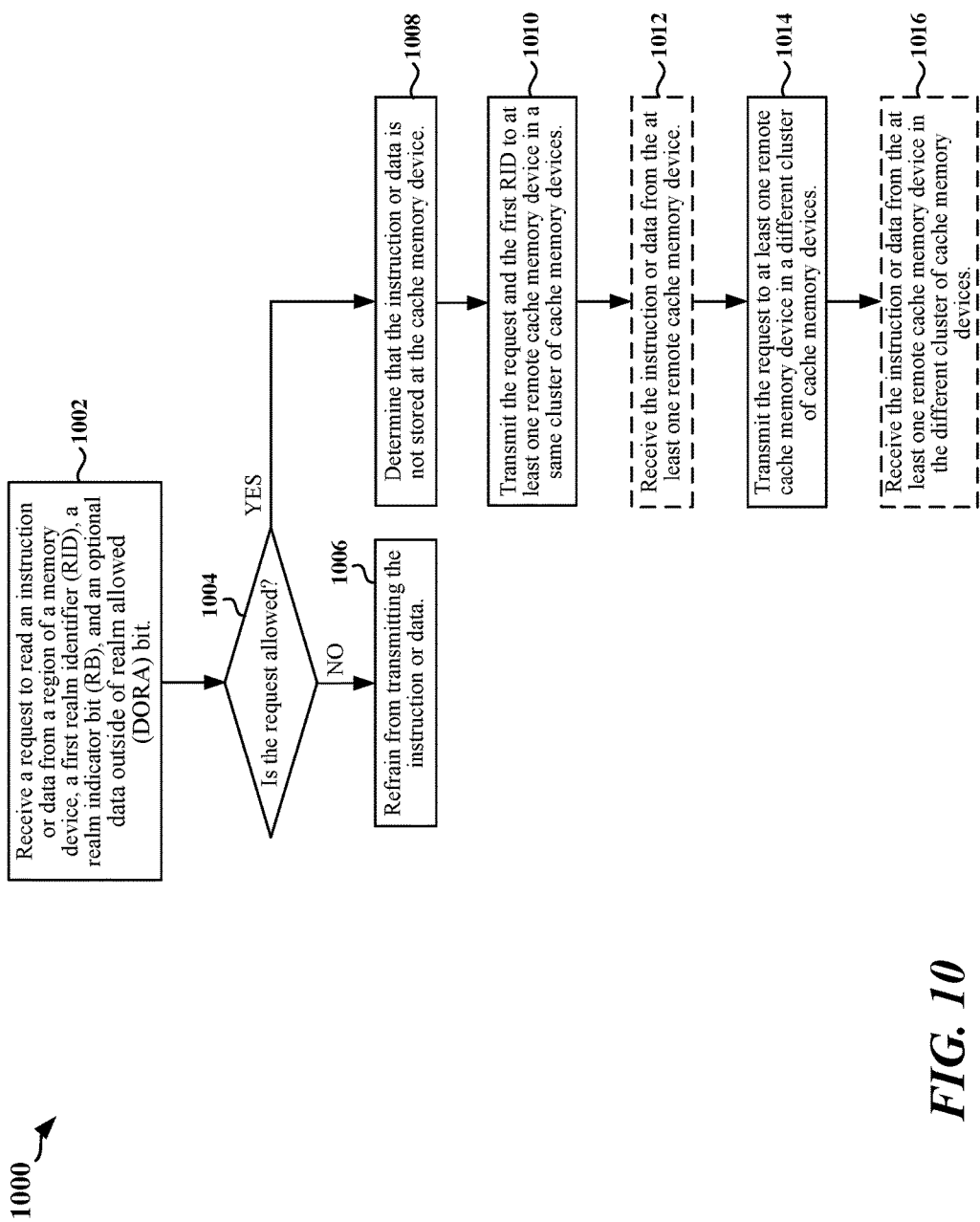
FIG. 10 illustrates a method operational in an apparatus for a memory transaction at a cache memory device in accordance with various aspects of the present disclosure.

FIG. 10 illustrates a method operational in an apparatus for a memory transaction at a cache memory device in accordance with various aspects of the present disclosure. It should be understood that the operations indicated with dotted lines in FIG. 10 represent optional operations. In an aspect, the cache memory device may receive a request (also referred to as a memory transaction) to read an instruction or data associated with a memory device 1002. The request may include a first realm identifier (RID) that enables identification of a realm that includes one or more selected regions in the memory device. The request may further include a realm indicator bit (RB), and/or an optional DORA bit. The cache memory device may determine whether to allow or deny the request based on the first RID, the realm indicator bit, and/or the DORA bit 1004. In an aspect, the cache memory device may implement the operations of the example flow diagram 500 of FIG. 5 to determine whether to allow or deny the request. If the request is denied, the cache memory device may refrain from transmitting the instruction or data 1006. If the request is allowed, the cache memory device may determine that the instruction or data is not stored at the cache memory device 1008. The cache memory device may transmit the request and the first RID to at least one remote cache memory device in a same cluster of cache memory devices when the instruction or data is not stored in the cache memory device 1010. The cache memory device may receive the instruction or data from the at least one remote cache memory device 1012. The cache memory device may transmit the request to at least one remote cache memory device in a different cluster of caches when the instruction or data is not stored in the cache memory device 1014. The cache memory device may receive the instruction or data from at least one remote cache memory device in the different cluster of caches 1016. In an aspect, the received instruction or data from the at least one remote cache memory device in the different cluster of caches is encrypted at a software protection device associated with the at least one remote cache memory device based on an ephemeral encryption key and is subsequently decrypted at a software protection device associated with the cache memory device based on the ephemeral encryption key prior to reception.

Fourth Example Method

Figure 11:
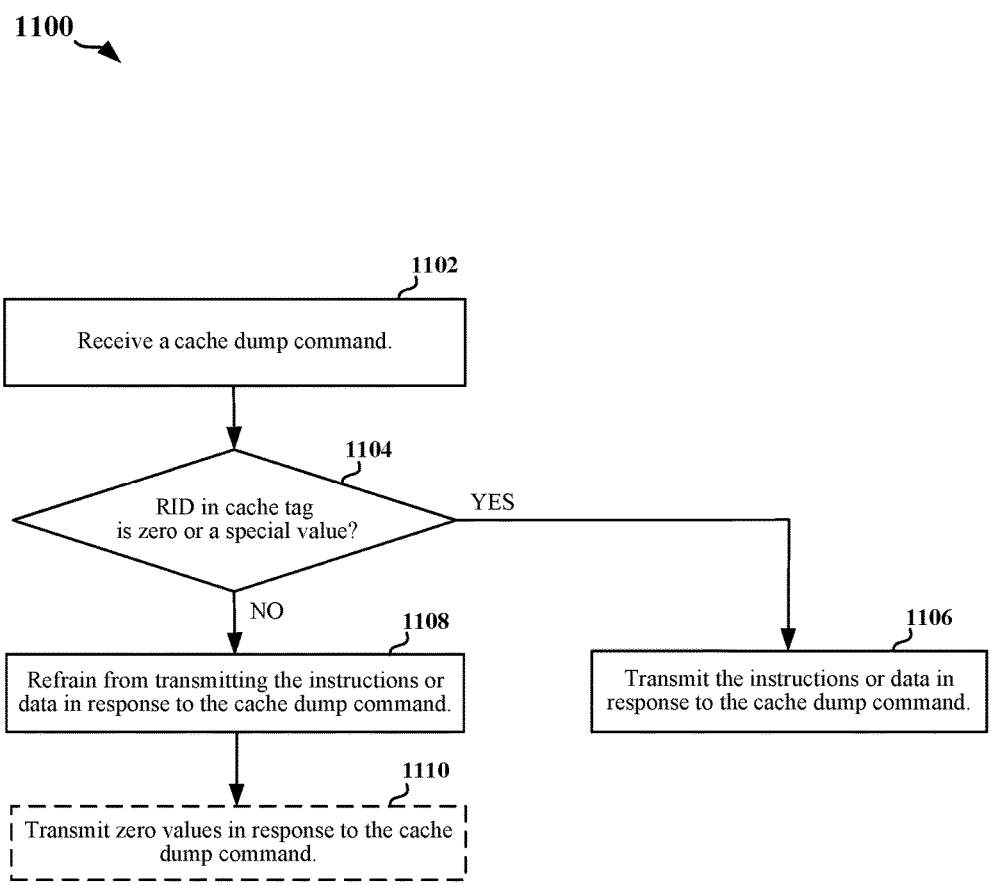
FIG. 11 illustrates a method operational in an apparatus for a memory transaction at a cache memory device in accordance with various aspects of the present disclosure.

FIG. 11 illustrates a method operational in an apparatus for a memory transaction at a cache memory device in accordance with various aspects of the present disclosure. It should be understood that the operations indicated with dotted lines in FIG. 11 represent optional operations. The cache memory device receives a cache dump command 1102. The cache memory device determines whether an RID in a cache tag stored at the cache memory device is zero (or a special value that indicates no realm) when an instruction or data is currently stored in the cache memory device 1104. If the RID in the cache tag is zero (or a special value that indicates no realm), the cache memory device transmits the instruction or data associated with the cache tag 1106. Otherwise, the cache memory device refrains from transmitting the instruction or data in response to the cache dump command when the second RID in the cache tag is different from zero (or a special value that indicates no realm). The cache memory device may proceed to transmit zero ('0') values in response to the cache dump command when the second RID in the cache tag is different from zero (or the special value that indicates no realm) 1110.

Fifth Example Method

FIG. 12 illustrates a method operational in an apparatus for a secure memory transaction at a software protection device in accordance with various aspects of the present disclosure. The software protection device receives a request to read a memory device, the request including a realm identifier that is associated with one or more selected regions in the memory device 1202. The software protection device decrypts at least one of an instruction or data retrieved from the one or more selected regions in the memory device based on an ephemeral encryption key associated with the realm identifier 1204. The software protection device transmits the at least one of the decrypted instructions or decrypted data to a cache memory device with the realm identifier 1206.

Sixth Example Method

FIG. 13 illustrates a method operational in an apparatus for a secure memory transaction at a software protection device in accordance with various aspects of the present disclosure. The software protection device receives a request to write data to a memory device, the request including an RID that is associated with one or more selected regions in the memory device 1302. The software protection device encrypts the data based on an ephemeral encryption key associated with the realm identifier 1304. The software protection device transmits the encrypted data to the memory device 1306.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method for a cache memory device, comprising:
receiving a request to read an instruction or data associated with a memory device, the request including at least a first realm identifier and a realm indicator bit, wherein the first realm identifier enables identification of a realm that includes one or more selected regions in the memory device;
determining whether the first realm identifier matches a second realm identifier in a cache tag when the instruction or data is stored in the cache memory device, wherein the instruction or data stored in the cache memory device has been decrypted based on an ephemeral encryption key associated with the second realm identifier when the first realm identifier indicates the realm and when the realm indicator bit is enabled; and
transmitting the instruction or data when the first realm identifier matches the second realm identifier.

2. The method of claim 1, further comprising:
refraining from transmitting the instruction when the first realm identifier does not match the second realm identifier.

3. The method of claim 1, wherein the ephemeral encryption key is a temporary or transitory encryption key that exists while the realm is maintained in the memory device.

4. The method of claim 1, wherein the request further includes a control bit indicating whether access to data outside of a realm is allowed, further comprising:
determining whether to allow or deny the request based on at least the first realm identifier, the realm indicator bit, or the control bit; and
refraining from transmitting the data or instructions when the request is denied.

5. The method of claim 4, wherein the request is allowed when the request is to read the data, the first realm identifier indicates the realm, the realm indicator bit is not enabled, and the control bit is enabled.

6. The method of claim 4, further comprising:
defining the first realm identifier as zero when the request is to read the data, the first realm identifier indicates the realm, the realm indicator bit is not enabled, and the control bit is enabled.

7. The method of claim 1, further comprising:
obtaining the instruction or data from the memory device when the instruction or data is not stored in the cache memory device; and
storing the obtained instruction or data at the cache memory device with a second cache tag including the first realm identifier.

8. The method of claim 7, wherein the instruction or data received from the memory device has been decrypted based on the ephemeral encryption key associated with the first realm identifier when the first realm identifier indicates the realm and when the realm indicator bit is enabled.

9. The method of claim 1, further comprising:
receiving a cache dump command;
determining whether the second realm identifier in the cache tag is zero or a special value that indicates no realm when the instruction or data is stored in the cache memory device; and
refraining from transmitting the instruction or data in response to the cache dump command when the second realm identifier in the cache tag is different from zero or a special value that indicates no realm.

10. The method of claim 9, further comprising:
transmitting zero values in response to the cache dump command when the second realm identifier in the cache tag is different from zero or the special value that indicates no realm.

11. The method of claim 1, further comprising:
transmitting the request and the first realm identifier to at least one remote cache memory in a same cluster of caches when the instruction or data is not stored in the cache memory device; and
receiving the instruction or data from the at least one remote cache memory device.

12. The method of claim 1, further comprising:
transmitting the request to at least one remote cache memory device in a different cluster of caches when the instruction or data is not stored in the cache memory device; and
receiving the instruction or data from the at least one remote cache memory device, wherein the received instruction or data is encrypted at a software protection device associated with the at least one remote cache memory device based on the ephemeral encryption key and is subsequently decrypted at a software protection device associated with the cache memory device based on the ephemeral encryption key prior to reception.

13. An apparatus, comprising:
a memory device;
a core device coupled to the memory device; and
a cache memory device coupled to the memory device and the core device, the cache memory device including a processing circuit configured to
receive a request to read an instruction or data associated with the memory device, the request including at least a first realm identifier and a realm indicator bit, wherein the first realm identifier enables identification of a realm that includes one or more selected regions in the memory device;
determine whether the first realm identifier matches a second realm identifier in a cache tag when the instruction or data is stored in the cache memory device, wherein the instruction or data stored in the cache memory device has been decrypted based on an ephemeral encryption key associated with the second realm identifier when the first realm identifier indicates the realm and when the realm indicator bit is enabled; and
transmit the instruction or data when the first realm identifier matches the second realm identifier.

14. The apparatus of claim 13, wherein the processing circuit is further configured to:
refrain from transmitting the instruction when the first realm identifier does not match the second realm identifier.

15. The apparatus of claim 13, wherein the ephemeral encryption key is a temporary or transitory encryption key that exists while the realm is maintained in the memory device.

16. The apparatus of claim 13, wherein the request further includes a control bit indicating whether access to data outside of a realm is allowed, wherein the processing circuit is further configured to:
  determine whether to allow or deny the request based on at least the first realm identifier, the realm indicator bit, or the control bit; and
  refrain from transmitting the data or instruction when the request is denied.

17. The apparatus of claim 16, wherein the request is allowed when the request is to read the data, the first realm identifier indicates the realm, the realm indicator bit is not enabled, and the control bit is enabled.

18. The apparatus of claim 16, wherein the processing circuit is further configured to:
  define the first realm identifier as zero or a special value that indicates no realm when the request is to read the data, the first realm identifier indicates the realm, the realm indicator bit is not enabled, and the control bit is enabled.

19. The apparatus of claim 13, wherein the processing circuit is further configured to:
  obtain the instruction or data from the memory device when the instruction or data is not stored in the cache memory device; and
  store the obtained instruction or data at the cache memory device with a second cache tag including the first realm identifier.

20. The apparatus of claim 19, wherein the instruction or data received from the memory device has been decrypted based on the ephemeral encryption key associated with the first realm identifier when the first realm identifier indicates the realm and when the realm indicator bit is enabled.

21. The apparatus of claim 16, wherein the processing circuit is further configured to:
  receive a cache dump command;
  determine whether the second realm identifier in the cache tag is zero or a special value that indicates no realm when the instruction or data is stored in the cache memory device; and
  refrain from transmitting the instruction or data in response to the cache dump command when the second realm identifier in the cache tag is different from zero or the special value that indicates no realm.

22. The apparatus of claim 21, wherein the processing circuit is further configured to:
  transmit zero values in response to the cache dump command when the second realm identifier in the cache tag is different from zero or the special value that indicates no realm.

23. The apparatus of claim 13, wherein the processing circuit is further configured to:
  transmit the request and the first realm identifier to at least one remote cache memory in a same cluster of caches when the instruction or data is not stored in the cache memory device; and
  receive the instruction or data from the at least one remote cache memory device.

24. The apparatus of claim 13, wherein the processing circuit is further configured to:
  transmit the request to at least one remote cache memory device in a different cluster of caches when the instruction or data is not stored in the cache memory device; and
  receive the instruction or data from the at least one remote cache memory device, wherein the received instruction or data is encrypted at a software protection device associated with the at least one remote cache memory device based on the ephemeral encryption key and is subsequently decrypted at a software protection device associated with the cache memory device based on the ephemeral encryption key prior to reception.

25. An apparatus, comprising:
  means for receiving a request to read an instruction or data associated with a memory device, the request including at least a first realm identifier and a realm indicator bit, wherein the first realm identifier enables identification of a realm that includes one or more selected regions in the memory device;
  means for determining whether the first realm identifier matches a second realm identifier in a cache tag when the instruction or data is stored in the apparatus, wherein the instruction or data stored in the apparatus has been decrypted based on an ephemeral encryption key associated with the second realm identifier when the first realm identifier indicates the realm and when the realm indicator bit is enabled; and
  means for transmitting the instruction or data when the first realm identifier matches the second realm identifier.

26. A non-transitory processor-readable storage medium having instructions stored thereon, which when executed by at least one processing circuit causes the at least one processing circuit to:
  receive a request to read an instruction or data associated with a memory device, the request including at least a first realm identifier and a realm indicator bit, wherein the first realm identifier enables identification of a realm that includes one or more selected regions in the memory device;
  determine whether the first realm identifier matches a second realm identifier in a cache tag when the instruction or data is stored in a cache memory device, wherein the instruction or data stored in the cache memory device has been decrypted based on an ephemeral encryption key associated with the second realm identifier when the first realm identifier indicates the realm and when the realm indicator bit is enabled; and
  transmit the instruction or data when the first realm identifier matches the second realm identifier.

27. A method for a cache memory device, comprising:
  receiving a request to write data to a memory page associated with a region of a memory device, the request including at least a first realm identifier and a realm indicator bit, wherein the first realm identifier enables identification of a realm that includes one or more selected regions in the memory device;
  determining whether the memory page is stored at the cache memory device;
  determining whether a second realm identifier in a cache tag associated with the memory page matches the first realm identifier when the memory page is stored at the cache memory device; and
  storing the data in the memory page at the cache memory device with a cache tag that includes the first realm identifier when the first realm identifier matches the second realm identifier.

28. The method of claim 27, wherein the request further includes a control bit indicating whether access to data outside of a realm is allowed, further comprising:
  determining whether to allow or deny the request to write the data based on at least the first realm identifier, the realm indicator bit, or the control bit; and
  refraining from storing the data in the memory page at the cache memory device when the request is denied.

29. The method of claim 28, wherein the request to write the data is allowed when the first realm identifier indicates the realm, the realm indicator bit is not enabled, and the control bit is enabled.

30. The method of claim 27, further comprising:
  storing the data in the memory page at the cache memory device with a cache tag that includes the first realm identifier when the memory page is not stored at the cache memory device,
  wherein when the first realm identifier is not zero and the realm indicator bit is set for the memory page, the data is encrypted with an ephemeral encryption key associated with the first realm identifier after the cache memory device is flushed.

31. The method of claim 30, further comprising:
  defining the first realm identifier as zero or a special value that indicates no realm when the first realm identifier indicates the realm in the memory device, the realm indicator bit is not enabled, and the control bit is enabled.

32. The method of claim 27, further comprising:
  refraining from storing the data in the memory page at the cache memory device when the first realm identifier does not match the second realm identifier.

33. The method of claim 27, wherein the data stored in the memory page at the cache memory device when the first realm identifier matches the second realm identifier is encrypted using an ephemeral encryption key associated with the first realm identifier prior to storage in the region of the memory device corresponding to the memory page.

34. An apparatus, comprising:
  a memory device;
  a core device coupled to the memory device; and
  a cache memory device coupled to the memory device and the core device, the cache memory device including a processing circuit configured to:
    receive a request to write data to a memory page associated with a region of a memory device, the request including at least a first realm identifier and a realm indicator bit, wherein the first realm identifier enables identification of a realm that includes one or more selected regions in the memory device;
    determine whether the memory page is stored at the cache memory device;
    determine whether a second realm identifier in a cache tag associated with the memory page matches the first realm identifier when the memory page is stored at the cache memory device; and
    store the data in the memory page at the cache memory device with a cache tag that includes the first realm identifier when the first realm identifier matches the second realm identifier.

35. The apparatus of claim 34, wherein the request further includes a control bit indicating whether access to data outside of a realm is allowed, wherein the processing circuit is further configured to:
  determine whether to allow or deny the request to write the data based on at least the first realm identifier, the realm indicator bit, or the control bit; and
  refrain from storing the data in the memory page at the cache memory device when the request is denied.

36. The apparatus of claim 35, wherein the request to write the data is allowed when the first realm identifier indicates the realm, the realm indicator bit is not enabled, and the control bit is enabled.

37. The apparatus of claim 34, wherein the processing circuit is further configured to:
  store the data in the memory page at the cache memory device with a cache tag that includes the first realm identifier when the memory page is not stored at the cache memory device,
  wherein when the first realm identifier is not zero and the realm indicator bit is set for the memory page, the data is encrypted with an ephemeral encryption key associated with the first realm identifier after the cache memory device is flushed.

38. The apparatus of claim 35, wherein the processing circuit is further configured to:
  define the first realm identifier as zero or a special value that indicates no realm when the first realm identifier indicates the realm in the memory device, the realm indicator bit is not enabled, and the control bit is enabled.

39. The apparatus of claim 34, wherein the processing circuit is further configured to:
  refrain from storing the data in the memory page at the cache memory device when the first realm identifier does not match the second realm identifier.

40. The apparatus of claim 34, wherein the data stored in the memory page at the cache memory device when the first realm identifier matches the second realm identifier is encrypted using an ephemeral encryption key associated with the first realm identifier prior to storage in the region of the memory device corresponding to the memory page.

41. An apparatus, comprising:
  means for receiving a request to write data to a memory page associated with a region of a memory device, the request including at least a first realm identifier and a realm indicator bit, wherein the first realm identifier enables identification of a realm that includes one or more selected regions in the memory device;
  means for determining whether the memory page is stored at the apparatus;
  means for determining whether a second realm identifier in a cache tag associated with the memory page matches the first realm identifier when the memory page is stored at the apparatus; and
  means for storing the data in the memory page at the apparatus with a cache tag that includes the first realm identifier when the first realm identifier matches the second realm identifier.

42. A non-transitory processor-readable storage medium having instructions stored thereon, which when executed by at least one processing circuit causes the at least one processing circuit to:
  receive a request to write data to a memory page associated with a region of a memory device, the request including at least a first realm identifier and a realm indicator bit, wherein the first realm identifier enables identification of a realm that includes one or more selected regions in the memory device;
  determine whether the memory page is stored at a cache memory device;

determine whether a second realm identifier in a cache tag associated with the memory page matches the first realm identifier when the memory page is stored at the cache memory device; and store the data in the memory page at the cache memory device with a cache tag that includes the first realm identifier when the first realm identifier matches the second realm identifier.

\* \* \* \* \*